(12) United States Patent
Steele et al.

(10) Patent No.: US 12,589,549 B2
(45) Date of Patent: Mar. 31, 2026

(54) SYSTEMS AND METHODS FOR ADDITIVE MANUFACTURING

(71) Applicant: General Electric Company, Schenectady, NY (US)

(72) Inventors: William Joseph Steele, Lawrenceburg, IN (US); Christopher David Barnhill, Cincinnati, OH (US); Brian Thomas Thompson, Loveland, OH (US); Meredith Elissa Dubelman, Liberty Township, OH (US); Xi Yang, Mason, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 17/729,142

(22) Filed: Apr. 26, 2022

(65) Prior Publication Data

US 2022/0339859 A1 Oct. 27, 2022

Related U.S. Application Data

(60) Provisional application No. 63/180,319, filed on Apr. 27, 2021.

(51) Int. Cl.
*B29C 64/245* (2017.01)
*B29C 64/124* (2017.01)
(Continued)

(52) U.S. Cl.
CPC .......... *B29C 64/124* (2017.08); *B29C 64/232* (2017.08); *B29C 64/236* (2017.08);
(Continued)

(58) Field of Classification Search
CPC ... B29C 64/124; B29C 64/264; B29C 64/232; B29C 64/245; B29C 64/236
See application file for complete search history.

(56) References Cited

U.S. PATENT DOCUMENTS

| | | | |
|---|---|---|---|
| 1,990,749 A | 2/1935 | Phillips et al. | |
| 2,259,517 A | 10/1941 | Drenkard, Jr. | |

(Continued)

FOREIGN PATENT DOCUMENTS

| | | |
|---|---|---|
| CN | 101628477 A | 1/2010 |
| CN | 103210344 A | 7/2013 |

(Continued)

OTHER PUBLICATIONS

Admatec, Admaflex 300 DLP 3D Printer, Specifications, Features, Design and Functions, Netherlands, 2 Pages. Retrieved Nov. 5, 2020 from Webpage: https://admateceurope.com/files/10f1a369c223994 3e6506f27ba920bd4dd9359078e744369595ab6ffbde75c6c?filename= Admaflex%20300%20brochure.pdf&sig=hQyDlzxkSmFOZwjM.

(Continued)

*Primary Examiner* — JaMel M Nelson
*Assistant Examiner* — Erica Hartsell Funk
(74) *Attorney, Agent, or Firm* — Dinsmore & Shohl LLP

(57) ABSTRACT

An additive manufacturing apparatus includes a support plate defining a window and a resin support configured to support an uncured layer of resin. A stage is configured to hold one or more cured layers of the resin to form a component positioned opposite a support plate. A radiant energy device is positioned on an opposite side of the resin support from the stage and is operable to generate and project radiant energy in a patterned image through the window. The stage is configured to move simultaneously with the resin support from a first position to a second position in an X-axis direction.

15 Claims, 17 Drawing Sheets

(51) Int. Cl.

| | |
|---|---|
| *B29C 64/232* | (2017.01) |
| *B29C 64/236* | (2017.01) |
| *B29C 64/264* | (2017.01) |
| *B33Y 10/00* | (2015.01) |
| *B33Y 30/00* | (2015.01) |

(52) U.S. Cl.
CPC .......... *B29C 64/245* (2017.08); *B29C 64/264*
(2017.08); *B33Y 10/00* (2014.12); *B33Y 30/00*
(2014.12)

(56) References Cited

U.S. PATENT DOCUMENTS

| | | | |
|---|---|---|---|
| 3,264,103 A | 8/1966 | Cohen et al. |
| 3,395,014 A | 7/1968 | Cohen et al. |
| 3,486,482 A | 12/1969 | Hunger |
| 3,710,846 A | 1/1973 | Properzi |
| 3,875,067 A | 4/1975 | DeSorgo et al. |
| 3,991,149 A | 11/1976 | Hurwitt |
| 4,041,476 A | 8/1977 | Swainson |
| 4,292,827 A | 10/1981 | Waugh |
| 4,575,330 A | 3/1986 | Hull |
| 4,752,498 A | 6/1988 | Fudim |
| 4,945,032 A | 7/1990 | Murphy et al. |
| 5,015,312 A | 5/1991 | Kinzie |
| 5,026,146 A | 6/1991 | Hug et al. |
| 5,031,120 A | 7/1991 | Pomerantz et al. |
| 5,058,988 A | 10/1991 | Spence et al. |
| 5,059,021 A | 10/1991 | Spence et al. |
| 5,088,047 A | 2/1992 | Bynum |
| 5,094,935 A | 3/1992 | Vassiliou et al. |
| 5,096,530 A | 3/1992 | Cohen |
| 5,104,592 A | 4/1992 | Hull et al. |
| 5,123,734 A | 6/1992 | Spence et al. |
| 5,126,259 A | 6/1992 | Weiss et al. |
| 5,126,529 A | 6/1992 | Weiss et al. |
| 5,133,987 A | 7/1992 | Spence et al. |
| 5,162,167 A | 11/1992 | Minh et al. |
| 5,174,931 A | 12/1992 | Almquist et al. |
| 5,175,077 A | 12/1992 | Grossa |
| 5,182,055 A | 1/1993 | Allison et al. |
| 5,192,559 A | 3/1993 | Hull et al. |
| 5,203,944 A | 4/1993 | Prinz et al. |
| 5,204,055 A | 4/1993 | Sachs et al. |
| 5,207,371 A | 5/1993 | Prinz et al. |
| 5,236,326 A | 8/1993 | Grossa |
| 5,236,637 A | 8/1993 | Hull |
| 5,236,812 A | 8/1993 | Vassiliou et al. |
| 5,247,180 A | 9/1993 | Mitcham et al. |
| 5,248,456 A | 9/1993 | Evans, Jr. et al. |
| 5,258,146 A | 11/1993 | Almquist et al. |
| 5,314,711 A | 5/1994 | Baccini |
| 5,340,656 A | 8/1994 | Sachs et al. |
| 5,387,380 A | 2/1995 | Cima et al. |
| 5,432,045 A | 7/1995 | Narukawa et al. |
| 5,447,822 A | 9/1995 | Hull et al. |
| 5,454,069 A | 9/1995 | Knapp et al. |
| 5,460,758 A | 10/1995 | Langer et al. |
| 5,496,682 A | 3/1996 | Quadir et al. |
| 5,610,824 A | 3/1997 | Vinson et al. |
| 5,626,919 A | 5/1997 | Chapman et al. |
| 5,650,260 A | 7/1997 | Onishi |
| 5,660,621 A | 8/1997 | Bredt |
| 5,665,401 A | 9/1997 | Serbin et al. |
| 5,688,464 A | 11/1997 | Jacobs et al. |
| 5,693,144 A | 12/1997 | Jacobs et al. |
| 5,697,043 A | 12/1997 | Baskaran et al. |
| 5,717,599 A | 2/1998 | Menhennett et al. |
| 5,718,279 A | 2/1998 | Saoth et al. |
| 5,746,833 A | 5/1998 | Gerhardt |
| 5,764,521 A | 6/1998 | Batchelder et al. |
| 5,807,437 A | 9/1998 | Sachs et al. |
| 5,824,184 A | 10/1998 | Kamijo et al. |
| 5,851,465 A | 12/1998 | Bredt |
| 5,866,058 A | 2/1999 | Batchelder et al. |
| 5,895,547 A | 4/1999 | Kathrein et al. |
| 5,900,207 A | 5/1999 | Danforth et al. |
| 5,939,008 A | 8/1999 | Comb et al. |
| 5,940,674 A | 8/1999 | Sachs et al. |
| 5,945,058 A | 8/1999 | Manners et al. |
| 5,968,561 A | 10/1999 | Batchelder et al. |
| 5,980,813 A | 11/1999 | Narang et al. |
| 5,985,204 A | 11/1999 | Otsuka et al. |
| 6,051,179 A | 4/2000 | Hagenau |
| 6,067,480 A | 5/2000 | Stuffle et al. |
| 6,068,367 A | 5/2000 | Fabbri |
| 6,110,411 A | 8/2000 | Clausen et al. |
| 6,146,567 A | 11/2000 | Sachs et al. |
| 6,193,923 B1 | 2/2001 | Leyden et al. |
| 6,200,646 B1 | 3/2001 | Neckers et al. |
| 6,206,672 B1 | 3/2001 | Grenda |
| 6,363,606 B1 | 4/2002 | Johnson et al. |
| 6,375,451 B1 | 4/2002 | Robinson et al. |
| 6,376,148 B1 | 4/2002 | Liu et al. |
| 6,391,245 B1 | 5/2002 | Smith |
| 6,399,010 B1 | 6/2002 | Guertin et al. |
| 6,401,002 B1 | 6/2002 | Jang et al. |
| 6,403,002 B1 | 6/2002 | van der Geest |
| 6,436,520 B1 | 8/2002 | Yamamoto |
| 6,450,393 B1 | 9/2002 | Doumanidis et al. |
| 6,463,349 B2 | 10/2002 | White et al. |
| 6,471,800 B2 | 10/2002 | Jang et al. |
| 6,500,378 B1 | 12/2002 | Smith |
| 6,512,869 B1 | 1/2003 | Imayama et al. |
| 6,543,506 B1 | 4/2003 | Phillips |
| 6,575,218 B1 | 6/2003 | Burns et al. |
| 6,596,224 B1 | 7/2003 | Sachs et al. |
| 6,641,897 B2 | 11/2003 | Gervasi |
| 6,649,113 B1 | 11/2003 | Manners et al. |
| 6,660,209 B2 | 12/2003 | Leyden et al. |
| 6,668,892 B2 | 12/2003 | Vasilakes et al. |
| 6,682,598 B1 | 1/2004 | Steinmueller et al. |
| 6,780,368 B2 | 8/2004 | Liu et al. |
| 6,786,711 B2 | 9/2004 | Koch et al. |
| 6,838,035 B1 | 1/2005 | Ederer et al. |
| 6,850,334 B1 | 2/2005 | Gothait |
| 6,852,272 B2 | 2/2005 | Artz et al. |
| 6,896,839 B2 | 5/2005 | Kubo et al. |
| 6,914,406 B1 | 7/2005 | Wilkes et al. |
| 6,930,144 B2 | 8/2005 | Oriakhi |
| 6,947,058 B1 | 9/2005 | Elmquist |
| 6,966,960 B2 | 11/2005 | Boyd et al. |
| 6,974,521 B2 | 12/2005 | Schermer |
| 6,986,654 B2 | 1/2006 | Imiolek et al. |
| 7,008,209 B2 | 3/2006 | Iskra et al. |
| 7,016,738 B1 | 3/2006 | Karunasiri |
| 7,022,207 B2 | 4/2006 | Hirsch |
| 7,045,738 B1 | 5/2006 | Kovacevic et al. |
| 7,052,263 B2 | 5/2006 | John |
| 7,070,250 B2 | 7/2006 | Lester et al. |
| 7,074,029 B2 | 7/2006 | Stockwell et al. |
| 7,084,875 B2 | 8/2006 | Plante |
| 7,087,109 B2 | 8/2006 | Bredr et al. |
| 7,158,849 B2 | 1/2007 | Huang et al. |
| 7,164,420 B2 | 1/2007 | Ard |
| 7,195,472 B2 | 3/2007 | John |
| 7,261,542 B2 | 8/2007 | Hickerson et al. |
| 7,270,528 B2 | 9/2007 | Sherwood |
| 7,300,613 B2 | 11/2007 | Sano et al. |
| 7,351,304 B2 | 4/2008 | Liang et al. |
| 7,402,219 B2 | 7/2008 | Graf |
| 7,438,846 B2 | 10/2008 | John |
| 7,455,804 B2 | 11/2008 | Patel et al. |
| 7,520,740 B2 | 4/2009 | Wahlstrom et al. |
| 7,550,518 B2 | 6/2009 | Bredt et al. |
| 7,555,726 B2 | 6/2009 | Kurtenbach et al. |
| 7,569,174 B2 | 8/2009 | Ruatta et al. |
| 7,572,403 B2 | 8/2009 | Gu et al. |
| 7,575,682 B2 | 8/2009 | Olsta et al. |
| 7,578,958 B2 | 8/2009 | Patel et al. |
| 7,614,866 B2 | 11/2009 | Sperry et al. |
| 7,614,886 B2 | 11/2009 | Sperry et al. |
| 7,636,610 B2 | 12/2009 | Schillen et al. |
| 7,698,947 B2 | 4/2010 | Sarr |

(56) References Cited

U.S. PATENT DOCUMENTS

| | | | |
|---|---|---|---|
| 7,706,910 B2 | 4/2010 | Hull et al. | |
| 7,742,060 B2 | 6/2010 | Maillot | |
| 7,758,799 B2 | 7/2010 | Hull et al. | |
| 7,767,132 B2 | 8/2010 | Patel et al. | |
| 7,771,183 B2 | 8/2010 | Hull et al. | |
| 7,780,429 B2 | 8/2010 | Kikuchi | |
| 7,783,371 B2 | 8/2010 | John et al. | |
| 7,785,093 B2 | 8/2010 | Holmboe et al. | |
| 7,790,093 B2 | 9/2010 | Shkolnik et al. | |
| 7,795,349 B2 | 9/2010 | Bredt et al. | |
| 7,815,826 B2 | 10/2010 | Serdy et al. | |
| 7,845,930 B2 | 12/2010 | Shkolnik et al. | |
| 7,867,302 B2 | 1/2011 | Nevoret et al. | |
| 7,892,474 B2 | 2/2011 | Shkolnik et al. | |
| 7,894,921 B2 | 2/2011 | John et al. | |
| 7,931,460 B2 | 4/2011 | Scott et al. | |
| 7,962,238 B2 | 6/2011 | Shkolnik et al. | |
| 7,964,047 B2 | 6/2011 | Ishida | |
| 7,995,073 B1 | 8/2011 | Shemanarev et al. | |
| 8,003,040 B2 | 8/2011 | El-Siblani | |
| 8,029,642 B2 | 10/2011 | Hagman | |
| 8,048,261 B2 | 11/2011 | McCowin | |
| 8,070,473 B2 | 12/2011 | Kozlak | |
| 8,071,055 B2 | 12/2011 | Newcombe | |
| 8,096,262 B2 | 1/2012 | Ederer et al. | |
| 8,105,066 B2 | 1/2012 | Sperry et al. | |
| 8,110,135 B2 | 2/2012 | El-Siblani | |
| 8,126,580 B2 | 2/2012 | El-Siblani et al. | |
| 8,157,908 B2 | 4/2012 | Williams | |
| 8,185,229 B2 | 5/2012 | Davidson | |
| 8,191,500 B2 | 6/2012 | Dohring et al. | |
| 8,211,226 B2 | 7/2012 | Bredt et al. | |
| 8,232,444 B2 | 7/2012 | Bar Nathan et al. | |
| 8,259,103 B2 | 9/2012 | Glueck et al. | |
| 8,269,767 B2 | 9/2012 | Glueck et al. | |
| 8,282,866 B2 | 10/2012 | Hiraide | |
| 8,326,024 B2 | 12/2012 | Shkolnik | |
| 8,372,330 B2 | 2/2013 | El-Siblani et al. | |
| 8,394,313 B2 | 3/2013 | El-Siblani et al. | |
| 8,413,578 B2 | 4/2013 | Doyle | |
| 8,424,580 B2 | 4/2013 | Anderson et al. | |
| 8,444,903 B2 | 5/2013 | Lyons et al. | |
| 8,454,879 B2 | 6/2013 | Kuzusako et al. | |
| 8,475,946 B1 | 7/2013 | Dion et al. | |
| 8,506,862 B2 | 8/2013 | Giller et al. | |
| 8,506,870 B2 | 8/2013 | Hochsmann et al. | |
| 8,513,562 B2 | 8/2013 | Bichsel | |
| 8,522,159 B2 | 8/2013 | Kurtenbach et al. | |
| 8,540,501 B2 | 9/2013 | Yasukochi | |
| 8,568,646 B2 | 10/2013 | Wang et al. | |
| 8,568,649 B1 | 10/2013 | Balistreri et al. | |
| 8,593,083 B2 | 11/2013 | Firhoj et al. | |
| 8,616,872 B2 | 12/2013 | Matsui et al. | |
| 8,623,264 B2 | 1/2014 | Rohner et al. | |
| 8,636,494 B2 | 1/2014 | Gothait et al. | |
| 8,636,496 B2 | 1/2014 | Das et al. | |
| 8,658,076 B2 | 2/2014 | El-Siblani | |
| 8,663,568 B2 | 3/2014 | Bar Nathan et al. | |
| 8,666,142 B2 | 3/2014 | Shkolnik et al. | |
| 8,703,037 B2 | 4/2014 | Hull et al. | |
| 8,715,832 B2 | 5/2014 | Ederer et al. | |
| 8,718,522 B2 | 5/2014 | Chillscyzn et al. | |
| 8,737,862 B2 | 5/2014 | Manico et al. | |
| 8,741,194 B1 | 6/2014 | Ederer et al. | |
| 8,741,203 B2 | 6/2014 | Liska et al. | |
| 8,744,184 B2 | 6/2014 | Ameline et al. | |
| 8,761,918 B2 | 6/2014 | Silverbrook | |
| 8,801,418 B2 | 8/2014 | El-Siblani et al. | |
| 8,805,064 B2 | 8/2014 | Ameline et al. | |
| 8,815,143 B2 | 8/2014 | John et al. | |
| 8,844,133 B2 | 9/2014 | Fuller | |
| 8,845,316 B2 | 9/2014 | Schillen et al. | |
| 8,845,953 B1 | 9/2014 | Balistreri et al. | |
| 8,862,260 B2 | 10/2014 | Shkolnik et al. | |
| 8,872,024 B2 | 10/2014 | Jamar et al. | |
| 8,873,024 B2 | 10/2014 | Jamar et al. | |
| 8,876,513 B2 | 11/2014 | Lim et al. | |
| 8,877,115 B2 | 11/2014 | Elsey | |
| 8,888,480 B2 | 11/2014 | Yoo et al. | |
| 8,915,728 B2 | 12/2014 | Mironets et al. | |
| 8,926,304 B1 | 1/2015 | Chen | |
| 8,932,511 B2 | 1/2015 | Napendensky | |
| 8,968,625 B2 | 3/2015 | Tan | |
| 8,974,717 B2 | 3/2015 | Maguire et al. | |
| 8,991,211 B1 | 3/2015 | Arlotti et al. | |
| 8,992,816 B2 | 3/2015 | Jonasson et al. | |
| 8,998,601 B2 | 4/2015 | Busato | |
| 9,011,982 B2 | 4/2015 | Muller et al. | |
| 9,031,680 B2 | 5/2015 | Napadensky | |
| 9,063,376 B2 | 6/2015 | Mizumura | |
| 9,064,922 B2 | 6/2015 | Nakajima et al. | |
| 9,067,359 B2 | 6/2015 | Rohner et al. | |
| 9,067,360 B2 | 6/2015 | Wehning et al. | |
| 9,067,361 B2 | 6/2015 | El-Siblani | |
| 9,073,260 B2 | 7/2015 | El-Siblani et al. | |
| 9,079,357 B2 | 7/2015 | Ebert et al. | |
| 9,101,321 B1 | 8/2015 | Kiesser | |
| 9,149,986 B2 | 10/2015 | Huang et al. | |
| 9,150,032 B2 | 10/2015 | Roof et al. | |
| 9,153,052 B2 | 10/2015 | Ameline et al. | |
| 9,159,155 B2 | 10/2015 | Andersen | |
| 9,186,847 B2 | 11/2015 | Fruth et al. | |
| 9,193,112 B2 | 11/2015 | Ohkusa et al. | |
| 9,205,601 B2 | 12/2015 | DeSimone et al. | |
| 9,211,678 B2 | 12/2015 | DeSimone et al. | |
| 9,216,546 B2 | 12/2015 | DeSimone et al. | |
| 9,221,100 B2 | 12/2015 | Schwarze et al. | |
| 9,233,504 B2 | 1/2016 | Douglas et al. | |
| 9,248,600 B2 | 2/2016 | Goodman et al. | |
| 9,259,880 B2 | 2/2016 | Chen | |
| 9,308,690 B2 | 4/2016 | Boyer et al. | |
| 9,327,385 B2 | 5/2016 | Webb et al. | |
| 9,346,217 B2 | 5/2016 | Huang et al. | |
| 9,346,218 B2 | 5/2016 | Chen et al. | |
| 9,360,757 B2 | 6/2016 | DeSimone et al. | |
| 9,364,848 B2 | 6/2016 | Silverbrook | |
| 9,403,322 B2 | 8/2016 | Das et al. | |
| 9,403,324 B2 | 8/2016 | Ederer et al. | |
| 9,415,443 B2 | 8/2016 | Ljungblad et al. | |
| 9,415,544 B2 | 8/2016 | Kerekes et al. | |
| 9,415,547 B2 | 8/2016 | Chen et al. | |
| 9,429,104 B2 | 8/2016 | Fuller | |
| 9,434,107 B2 | 9/2016 | Zenere | |
| 9,446,557 B2 | 9/2016 | Zenere et al. | |
| 9,453,142 B2 | 9/2016 | Rolland et al. | |
| 9,456,884 B2 | 10/2016 | Uckelmann et al. | |
| 9,457,374 B2 | 10/2016 | Hibbs et al. | |
| 9,463,488 B2 | 10/2016 | Ederer et al. | |
| 9,469,074 B2 | 10/2016 | Ederer et al. | |
| 9,486,944 B2 | 11/2016 | El-Siblani et al. | |
| 9,486,964 B2 | 11/2016 | Joyce | |
| 9,487,443 B2 | 11/2016 | Watanabe | |
| 9,498,920 B2 | 11/2016 | DeSimone et al. | |
| 9,498,921 B2 | 11/2016 | Teulet | |
| 9,511,546 B2 | 12/2016 | Chen et al. | |
| 9,517,591 B2 | 12/2016 | Yoo et al. | |
| 9,517,592 B2 | 12/2016 | Yoo et al. | |
| 9,527,244 B2 | 12/2016 | El-Siblani | |
| 9,527,272 B2 | 12/2016 | Steele | |
| 9,529,371 B2 | 12/2016 | Nakamura | |
| 9,533,450 B2 | 1/2017 | El-Siblani et al. | |
| 9,539,762 B2 | 1/2017 | Durand et al. | |
| 9,545,753 B2 | 1/2017 | Costabeber | |
| 9,545,784 B2 | 1/2017 | Nakamura | |
| 9,550,326 B2 | 1/2017 | Costabeber | |
| 9,561,622 B2 | 2/2017 | Das et al. | |
| 9,561,623 B2 | 2/2017 | El-Siblani et al. | |
| 9,578,695 B2 | 2/2017 | Jerby et al. | |
| 9,579,852 B2 | 2/2017 | Okamoto | |
| 9,581,530 B2 | 2/2017 | Guthrie et al. | |
| 9,592,635 B2 | 3/2017 | Ebert et al. | |
| 9,604,411 B2 | 3/2017 | Rogren | |
| 9,610,616 B2 | 4/2017 | Chen et al. | |
| 9,616,620 B2 | 4/2017 | Hoechsmann et al. | |

(56) References Cited

U.S. PATENT DOCUMENTS

| | | | |
|---|---|---|---|
| 9,632,037 | B2 | 4/2017 | Chen et al. |
| 9,632,420 | B2 | 4/2017 | Allanic |
| 9,632,983 | B2 | 4/2017 | Ueda et al. |
| 9,636,873 | B2 | 5/2017 | Joyce |
| 9,649,812 | B2 | 5/2017 | Hartmann et al. |
| 9,649,815 | B2 | 5/2017 | Atwood et al. |
| 9,656,344 | B2 | 5/2017 | Kironn et al. |
| 9,670,371 | B2 | 6/2017 | Pervan et al. |
| 9,676,143 | B2 | 6/2017 | Kashani-Shirazi |
| 9,676,963 | B2 | 6/2017 | Rolland et al. |
| 9,682,166 | B2 | 6/2017 | Watanabe |
| 9,682,425 | B2 | 6/2017 | Xu et al. |
| 9,688,027 | B2 | 6/2017 | Batchelder et al. |
| 9,707,720 | B2 | 7/2017 | Chen et al. |
| 9,720,363 | B2 | 8/2017 | Chillscyzn et al. |
| 9,738,034 | B2 | 8/2017 | Gruber et al. |
| 9,738,564 | B2 | 8/2017 | Capobianco et al. |
| 9,751,292 | B2 | 9/2017 | Jamar et al. |
| 9,764,513 | B2 | 9/2017 | Stampfl et al. |
| 9,764,535 | B2 | 9/2017 | Xie et al. |
| 9,821,546 | B2 | 11/2017 | Schaafsma et al. |
| 9,862,146 | B2 | 1/2018 | Driessen et al. |
| 9,862,150 | B2 | 1/2018 | Chen et al. |
| 9,868,255 | B2 | 1/2018 | Comb et al. |
| 9,885,987 | B2 | 2/2018 | Chillscysn et al. |
| 9,895,843 | B2 | 2/2018 | Lobovsky et al. |
| 9,901,983 | B2 | 2/2018 | Hovel et al. |
| 9,908,293 | B2 | 3/2018 | Yoo et al. |
| 9,919,474 | B2 | 3/2018 | Napadensky |
| 9,919,515 | B2 | 3/2018 | Daniell et al. |
| 9,950,368 | B2 | 4/2018 | Lampenscherf et al. |
| 9,956,727 | B2 | 5/2018 | Steele |
| 9,962,767 | B2 | 5/2018 | Buller et al. |
| 9,981,411 | B2 | 5/2018 | Green et al. |
| 10,000,023 | B2 | 6/2018 | El-Siblani et al. |
| 10,011,076 | B2 | 7/2018 | El-Siblani et al. |
| 10,061,302 | B2 | 8/2018 | Jacobs et al. |
| 10,071,422 | B2 | 9/2018 | Buller et al. |
| 10,124,532 | B2 | 11/2018 | El-Siblani et al. |
| 10,150,254 | B2 | 12/2018 | Bauman et al. |
| 10,155,345 | B2 | 12/2018 | Ermoshkin et al. |
| 10,155,882 | B2 | 12/2018 | Rolland et al. |
| 10,183,330 | B2 | 1/2019 | Buller et al. |
| 10,183,444 | B2 | 1/2019 | Campbell |
| 10,240,066 | B2 | 3/2019 | Rolland et al. |
| 10,245,784 | B2 | 4/2019 | Teken et al. |
| 10,317,882 | B2 | 6/2019 | de Pena et al. |
| 10,336,055 | B2 | 7/2019 | Das et al. |
| 10,336,057 | B2 | 7/2019 | Moore et al. |
| 10,350,823 | B2 | 7/2019 | Rolland et al. |
| 10,357,956 | B2 | 7/2019 | Usami et al. |
| 10,406,748 | B2 | 9/2019 | Honda |
| 10,612,112 | B2 | 4/2020 | Yang et al. |
| 10,639,843 | B2 | 5/2020 | Yuan et al. |
| 10,682,808 | B2 | 6/2020 | Fujita et al. |
| 10,695,988 | B2 | 6/2020 | Hanyu et al. |
| 10,717,212 | B2 | 7/2020 | Parkinson et al. |
| 10,737,479 | B2 | 8/2020 | El-Siblani et al. |
| 2002/0164069 | A1 | 11/2002 | Nagano et al. |
| 2003/0180171 | A1 | 9/2003 | Artz et al. |
| 2003/0209836 | A1 | 11/2003 | Sherwood |
| 2005/0012239 | A1 | 1/2005 | Nakashima |
| 2005/0019016 | A1 | 1/2005 | Nakashika et al. |
| 2006/0230984 | A1 | 10/2006 | Bredt et al. |
| 2006/0248062 | A1 | 11/2006 | Libes et al. |
| 2007/0063366 | A1 | 3/2007 | Cunningham et al. |
| 2007/0116937 | A1 | 5/2007 | Lazzerini |
| 2008/0170112 | A1 | 7/2008 | Hull et al. |
| 2008/0224352 | A1 | 9/2008 | Narukawa et al. |
| 2008/0241404 | A1 | 10/2008 | Allaman et al. |
| 2010/0003619 | A1 | 1/2010 | Das et al. |
| 2010/0196694 | A1 | 8/2010 | Yamazaki et al. |
| 2010/0290016 | A1 | 11/2010 | Kaehr et al. |
| 2011/0089610 | A1 | 4/2011 | El-Siblani et al. |
| 2011/0101570 | A1 | 5/2011 | John et al. |
| 2011/0162989 | A1 | 7/2011 | Ducker et al. |
| 2011/0207057 | A1 | 8/2011 | Hull et al. |
| 2012/0195994 | A1 | 8/2012 | El-Siblani et al. |
| 2012/0292800 | A1 | 11/2012 | Higuchi et al. |
| 2013/0008879 | A1 | 1/2013 | Bichsel |
| 2013/0140741 | A1 | 6/2013 | El-Siblani et al. |
| 2014/0099476 | A1 | 4/2014 | Subramanian et al. |
| 2014/0103581 | A1 | 4/2014 | Das et al. |
| 2014/0200865 | A1 | 7/2014 | Lehmann et al. |
| 2014/0239554 | A1 | 8/2014 | El-Siblani et al. |
| 2014/0275317 | A1 | 9/2014 | Moussa |
| 2014/0319735 | A1 | 10/2014 | El-Siblani et al. |
| 2014/0322374 | A1 | 10/2014 | El-Siblani et al. |
| 2014/0332507 | A1 | 11/2014 | Fockele |
| 2014/0339741 | A1 | 11/2014 | Aghababaie et al. |
| 2014/0348691 | A1 | 11/2014 | Ljungblad et al. |
| 2014/0348692 | A1 | 11/2014 | Bessac et al. |
| 2015/0004042 | A1 | 1/2015 | Nimal |
| 2015/0004046 | A1 | 1/2015 | Graham et al. |
| 2015/0056365 | A1 | 2/2015 | Miyoshi |
| 2015/0086409 | A1 | 3/2015 | Hellestam |
| 2015/0102531 | A1 | 4/2015 | El-Siblani et al. |
| 2015/0104563 | A1 | 4/2015 | Lowe et al. |
| 2015/0140152 | A1 | 5/2015 | Chen |
| 2015/0140155 | A1 | 5/2015 | Ohno et al. |
| 2015/0145174 | A1 | 5/2015 | Comb |
| 2015/0158111 | A1 | 6/2015 | Schwarze et al. |
| 2015/0165695 | A1 | 6/2015 | Chen et al. |
| 2015/0210013 | A1 | 7/2015 | Teulet |
| 2015/0224710 | A1 | 8/2015 | El-Siblani |
| 2015/0231828 | A1 | 8/2015 | El-Siblani et al. |
| 2015/0231831 | A1 | 8/2015 | El-Siblani |
| 2015/0246487 | A1 | 9/2015 | El-Siblani |
| 2015/0251351 | A1 | 9/2015 | Feygin |
| 2015/0268099 | A1 | 9/2015 | Craig et al. |
| 2015/0298396 | A1 | 10/2015 | Chen et al. |
| 2015/0301517 | A1 | 10/2015 | Chen et al. |
| 2015/0306819 | A1 | 10/2015 | Ljungblad |
| 2015/0306825 | A1 | 10/2015 | Chen et al. |
| 2015/0321421 | A1 | 11/2015 | Ding |
| 2015/0352668 | A1 | 12/2015 | Scott et al. |
| 2015/0352791 | A1 | 12/2015 | Chen et al. |
| 2015/0355553 | A1 | 12/2015 | Allanic |
| 2015/0375452 | A1 | 12/2015 | Huang et al. |
| 2016/0016361 | A1 | 1/2016 | Lobovsky et al. |
| 2016/0031010 | A1 | 2/2016 | O'Neill et al. |
| 2016/0046075 | A1 | 2/2016 | DeSimone et al. |
| 2016/0046080 | A1 | 2/2016 | Thomas et al. |
| 2016/0052205 | A1 | 2/2016 | FrantzDale |
| 2016/0059484 | A1 | 3/2016 | DeSimone et al. |
| 2016/0059485 | A1 | 3/2016 | Ding et al. |
| 2016/0067921 | A1 | 3/2016 | Willis et al. |
| 2016/0082662 | A1 | 3/2016 | Majer |
| 2016/0082671 | A1 | 3/2016 | Joyce |
| 2016/0096332 | A1 | 4/2016 | Chen et al. |
| 2016/0107340 | A1 | 4/2016 | Joyce |
| 2016/0107383 | A1 | 4/2016 | Dikovsky et al. |
| 2016/0107387 | A1 | 4/2016 | Ooba et al. |
| 2016/0129631 | A1 | 5/2016 | Chen et al. |
| 2016/0137839 | A1 | 5/2016 | Rolland et al. |
| 2016/0167160 | A1 | 6/2016 | Hellestam |
| 2016/0176114 | A1 | 6/2016 | Tsai et al. |
| 2016/0184931 | A1 | 6/2016 | Green |
| 2016/0193785 | A1 | 7/2016 | Bell et al. |
| 2016/0214327 | A1 | 7/2016 | Ucklemann et al. |
| 2016/0221262 | A1 | 8/2016 | Das et al. |
| 2016/0243649 | A1 | 8/2016 | Zheng et al. |
| 2016/0303798 | A1 | 10/2016 | Mironets et al. |
| 2016/0332386 | A1 | 11/2016 | Kuijpers |
| 2016/0361871 | A1 | 12/2016 | Jeng et al. |
| 2016/0361872 | A1 | 12/2016 | El-Siblani |
| 2017/0008234 | A1 | 1/2017 | Cullen et al. |
| 2017/0008236 | A1 | 1/2017 | Easter et al. |
| 2017/0021562 | A1 | 1/2017 | El-Siblani et al. |
| 2017/0066185 | A1 | 3/2017 | Ermoshkin et al. |
| 2017/0066196 | A1 | 3/2017 | Beard et al. |
| 2017/0072635 | A1 | 3/2017 | El-Siblani et al. |
| 2017/0080641 | A1 | 3/2017 | El-Siblani |
| 2017/0087670 | A1 | 3/2017 | Kalentics et al. |

(56) References Cited

U.S. PATENT DOCUMENTS

| | | |
|---|---|---|
| 2017/0100895 A1 | 4/2017 | Chou et al. |
| 2017/0100897 A1 | 4/2017 | Chou et al. |
| 2017/0100899 A1 | 4/2017 | El-Siblani et al. |
| 2017/0102679 A1 | 4/2017 | Greene et al. |
| 2017/0113409 A1 | 4/2017 | Patrov |
| 2017/0120332 A1 | 5/2017 | DeMuth et al. |
| 2017/0120333 A1 | 5/2017 | DeMuth et al. |
| 2017/0120334 A1 | 5/2017 | DeMuth et al. |
| 2017/0120335 A1 | 5/2017 | DeMuth et al. |
| 2017/0120336 A1 | 5/2017 | DeMuth et al. |
| 2017/0120387 A1 | 5/2017 | DeMuth et al. |
| 2017/0120518 A1 | 5/2017 | DeMuth et al. |
| 2017/0120529 A1 | 5/2017 | DeMuth et al. |
| 2017/0120530 A1 | 5/2017 | DeMuth et al. |
| 2017/0120537 A1 | 5/2017 | DeMuth et al. |
| 2017/0120538 A1 | 5/2017 | DeMuth et al. |
| 2017/0123222 A1 | 5/2017 | DeMuth et al. |
| 2017/0123237 A1 | 5/2017 | DeMuth et al. |
| 2017/0136688 A1 | 5/2017 | Knecht et al. |
| 2017/0136708 A1 | 5/2017 | Das et al. |
| 2017/0157841 A1 | 6/2017 | Green |
| 2017/0157862 A1 | 6/2017 | Bauer |
| 2017/0165916 A1 | 6/2017 | El-Siblani |
| 2017/0173865 A1 | 6/2017 | Dikovsky et al. |
| 2017/0182708 A1 | 6/2017 | Lin et al. |
| 2017/0190120 A1 | 7/2017 | Bloome et al. |
| 2017/0276651 A1 | 9/2017 | Hall |
| 2017/0284971 A1 | 10/2017 | Hall |
| 2017/0291804 A1 | 10/2017 | Craft et al. |
| 2017/0297108 A1 | 10/2017 | Gibson et al. |
| 2017/0297109 A1 | 10/2017 | Gibson et al. |
| 2017/0305136 A1 | 10/2017 | Elsey |
| 2017/0326786 A1 | 11/2017 | Yuan et al. |
| 2017/0326807 A1 | 11/2017 | Greene et al. |
| 2017/0368816 A1 | 12/2017 | Batchelder et al. |
| 2018/0001567 A1 | 1/2018 | Juan et al. |
| 2018/0015672 A1 | 1/2018 | Shusteff et al. |
| 2018/0043619 A1 | 2/2018 | Kim et al. |
| 2018/0056585 A1 | 3/2018 | Du Toit |
| 2018/0056604 A1 | 3/2018 | Sands et al. |
| 2018/0079137 A1 | 3/2018 | Herzog et al. |
| 2018/0085998 A1 | 3/2018 | von Burg |
| 2018/0117790 A1 | 5/2018 | Yun |
| 2018/0169969 A1 | 6/2018 | Deleon et al. |
| 2018/0200948 A1 | 7/2018 | Kuijpers et al. |
| 2018/0201021 A1 | 7/2018 | Beaver et al. |
| 2018/0229332 A1 | 8/2018 | Tsai et al. |
| 2018/0229436 A1 | 8/2018 | Gu et al. |
| 2018/0272603 A1 | 9/2018 | MacCormack et al. |
| 2018/0272608 A1 | 9/2018 | Yun |
| 2018/0281284 A1* | 10/2018 | Elgar .................. B29C 64/371 |
| 2018/0311898 A1* | 11/2018 | Schwarzbaum ...... B29C 64/118 |
| 2018/0345600 A1 | 12/2018 | Holford et al. |
| 2018/0370214 A1 | 12/2018 | Comb et al. |
| 2019/0022937 A1 | 1/2019 | Stelter et al. |
| 2019/0039299 A1 | 2/2019 | Busbee et al. |
| 2019/0047211 A1 | 2/2019 | Herring et al. |
| 2019/0061230 A1 | 2/2019 | Ermoshkin et al. |
| 2019/0112499 A1 | 4/2019 | Rolland et al. |
| 2019/0126548 A1 | 5/2019 | Barnhart et al. |
| 2019/0232550 A1 | 8/2019 | Mark et al. |
| 2019/0240932 A1 | 8/2019 | Graf |
| 2019/0263054 A1 | 8/2019 | Kotler et al. |
| 2019/0270254 A1* | 9/2019 | Mark .................. B29C 64/118 |
| 2019/0283316 A1 | 9/2019 | Rolland et al. |
| 2019/0344381 A1 | 11/2019 | Pomerantz et al. |
| 2019/0389137 A1 | 12/2019 | Frohnmaier et al. |
| 2020/0001398 A1 | 1/2020 | Mellor et al. |
| 2020/0079008 A1 | 3/2020 | Chowdry et al. |
| 2020/0079017 A1 | 3/2020 | MacNeish, III et al. |
| 2020/0108553 A1 | 4/2020 | Rogren |
| 2020/0164437 A1 | 5/2020 | Goth et al. |
| 2020/0198224 A1 | 6/2020 | Dubelman et al. |
| 2020/0230938 A1 | 7/2020 | Menchik et al. |
| 2020/0247040 A1 | 8/2020 | Green |
| 2020/0290275 A1 | 9/2020 | Dubelman et al. |
| 2020/0307075 A1 | 10/2020 | Mattes et al. |
| 2020/0376775 A1 | 12/2020 | Das et al. |
| 2021/0046695 A1 | 2/2021 | Thompson et al. |

FOREIGN PATENT DOCUMENTS

| | | | |
|---|---|---|---|
| CN | 103522546 A | 1/2014 |
| CN | 104175559 A | 12/2014 |
| CN | 104647752 A | 5/2015 |
| CN | 105711101 A | 6/2016 |
| CN | 105773962 A | 7/2016 |
| CN | 107322930 A | 11/2017 |
| CN | 208946717 U | 6/2019 |
| CN | 109968661 A | 7/2019 |
| CN | 111497231 A | 8/2020 |
| DE | 102007010624 A1 | 9/2008 |
| EP | 448459 A1 | 9/1991 |
| EP | 557051 A1 | 8/1993 |
| EP | 1454831 B1 | 9/2004 |
| EP | 1852244 A2 | 11/2007 |
| EP | 1864785 A1 | 12/2007 |
| EP | 1946908 A2 | 7/2008 |
| EP | 2521524 A1 | 11/2012 |
| EP | 3053729 A1 | 8/2016 |
| EP | 3453521 A1 | 3/2019 |
| EP | 3356121 B1 | 10/2020 |
| GB | 2311960 A | 10/1997 |
| JP | H06246839 A | 9/1994 |
| JP | 2002370286 A | 12/2002 |
| JP | 2003039564 A | 2/2003 |
| JP | 2004/257929 A | 9/2004 |
| JP | 2016196098 A | 11/2016 |
| KR | 20170108729 A | 9/2017 |
| KR | 102109664 B1 | 5/2020 |
| WO | WO9600422 A1 | 1/1996 |
| WO | WO9806560 | 2/1998 |
| WO | WO0100390 A1 | 1/2001 |
| WO | WO2006/077665 A1 | 7/2006 |
| WO | WO2006109355 A1 | 10/2006 |
| WO | WO2017009368 A1 | 1/2017 |
| WO | WO2017098968 A1 | 6/2017 |
| WO | WO2017100538 A1 | 6/2017 |
| WO | WO2019/159936 A1 | 8/2019 |
| WO | WO2020033607 A1 | 2/2020 |
| WO | WO2020185553 A1 | 9/2020 |

OTHER PUBLICATIONS

Carbon, Carbon SpeedCell: Additive Manufacturing Reinvented, Redwood City California, Mar. 16, 2017, 4 Pages. Retrieved from Webpage: https://www.carbon3d.com/news/carbon-speedcell-additive-manufacturing-reinvented/.

Carbon, The 3D Printer for Products that Outperform, 8 Pages. Retrieved from Webpage: https: https://www.carbon3d.com.

DDM Systems, Disruptive Technologies for Additive Manufacturing, 2014. Retrieved on Jul. 7, 2020 from Web Link: http://www.ddmsys.com/.

Designing Buildings Wiki, Types of Brick Bonding, 6 Pages. Retrieved Mar. 25, 2021 from Webpage: https://www.designingbuildings.co.uk/wiki/Types_of_brick_bonding.

Doctor Blade with Micrometer Screw Gauge, The Tape Casting Warehouse, Inc., Morrisville PA, 6 Pages. Retrieved Mar. 23, 2021 from Webpage: https://www.drblade.com/.

Envisiontec, Advanced DLP for Superior 3D Printing, Mar. 9, 2017, 8 Pages. https://envisiontec.com/wp-content/uploads/2016/12/Why-EnvisionTEC-DLP-3D-Printing-is-Better-rebranded.pdf.

Feng et al., Exposure Reciprocity Law in Photopolymerization of Multi-Functional Acrylates and Methacrylates, Macromolecular Chemistry and Physics, vol. 208, 2007, pp. 295-306.

Formlabs, An Introduction to Post-Curing SLA 3D Prints, 8 Pages. Retrieved from Webpage: https://formlabs.com/blog/introduction-post-curing-sla-3d-prints.

Formlabs, Form Wash & Form Cure, 8 Pages. Retrieved from Webpage: https://formlabs.com/tools/wash-cure/.

(56) References Cited

OTHER PUBLICATIONS

Hafkamp et al., A Feasibility Study on Process Monitoring and Control in Vat Photopolymerization of Ceramics, Mechatronics, vol. 56, The Netherlands, Dec. 2018, pp. 220-241. Retrieved from https://doi.org/10.1016/j.mechatronics.2018.02.006.

Kudo3D, Post-Process Your SLA Prints in 4 Easy Steps, 8 Pages. Retrieved from Webpage: https://www.kudo3d.com/post-process-your-sla-prints-in-4-easy-steps/.

Leap, Low-Frequency Sonic Mixing Technology, Energy Efficiency & Renewable Energy, Energy.Gov, 5 Pages. Retrieved Mar. 17, 2021 from Webpage: https://www.energy.gov/eere/amo/low-frequency-sonic-mixing-technology.

Lee et al., Development of a 3D Printer Using Scanning Projection Stereolithography, Scientific Reports, vol. 5, Article No. 9875, 2015, 5 pages. https://www.nature.com/articles/srep09875#s1.

Lee et al., Large-Area Compatible Laser Sintering Schemes with a Spatially Extended Focused Beam, Journal, Micromachines, vol. 8, No. 153, Seoul University, Seoul Korea, May 11, 2017, 8 Pages. http://dx.doi.org/10.3390/mi8050153.

Limaye, Multi-Objective Process Planning Method for Mask Projection Stereolithography, Dissertation Georgia Institute of Technology, Dec. 2007, 324 Pages.

Lithoz, 2 Pages. Retrieved from Webpage: http://www.lithoz.com/en/our-products/cleaning-station.

Matthews et al., Diode-Based Additive Manufacturing of Metals Using an Optically-Addressable Light Valve, Optic Express Research Article, vol. 25, No. 10, Lawrence Livermore National Laboratory, Livermore CA, May 10, 2017.

Micron3D, Cleaning of Printed Models, YouTube, Dec. 5, 2016, 1 Page. Retrieved from Webpage: https://www.youtube.com/watch?v=soAIrSsliBY.

Nussbaum et al., Evaluation of Processing Variables in Large Area Polymer Sintering of Single Layer Components, Solid Freeform Fabrication 2016: Proceedings of the $27^{th}$ Annual International Solid Freeform Fabracation Symposium—An Additive Manufacturing Conference Reviewed Paper, University of South Florida, Tampa Florida.

Omegasonics, Ultrasonic Cleaning of 3D Printer Parts, YouTube, Feb. 26, 2014, 1 Page. Retrieved from Webpage: https://www.youtube.com/watch?v=Gxj47OS5ohk.

Park et al., Development of Multi-Material DLP 3D Printer, Journal of the Korean Society of Manufacturing Technology Engineers, vol.

26, Issue 1, Seoul Korea, Feb. 15, 2017, pp. 100-107. https://doi.org/10.7735/ksmte.2017.26.1.100.

Prodways Tech, Prodways Movinglight Technology Retrieved on Jul. 2, 2020 from Web Link: https://www.prodways.com/en/the-prodways-movinglight-technology/.

RAMCO Equipment Corporation, RAMCO RamTough-Fully Automated Wash/Rinse/Dry System, YouTube, Jul. 9, 2013, 1 Page. Retrieved from Webpage: https://www.youtube.com/watch?v=18S5Oc3FVFU.

Ricoh Imaging Company Ltd., The Advanced Pixel Shift Resolution System II for Super-High-Resolution Images, Pentax K-1 Mark II, Pixel Shift Resolution System, 4 Pages. Retrieved on Mar. 30, 2021 from Webpage: http://www.ricoh-imaging.co.jp/english/products/k-1-2/feature/02.html.

Sonics & Materials, Inc., Ultrasonic Food Cutting Equipment, Sonics & Materials, Inc., Retrieved on Jun. 26, 2020, 4 Pages. https://www.sonics.com/food-cutting.

Stemmer Imaging, Ultra-High Resolution for Industrial Imaging, Germany, 9 Pages. Retrieved on Mar. 30, 2021 from Webpage: https://www.stemmer-imaging.com/en/knowledge-base/pixel-shift-technology/.

Stevenson, Admatec's Ceramic 3D Printers, Ceramic, Metal, Fabbaloo 3D Printing News, Jan. 21, 2019, 8 Pages. Retrieved Nov. 24, 2020 from Weblink: https://www.fabbaloo.com/blog/2019/1/21/adamtecs-ceramics-3d-printers.

Techmetals, Electroless Nickel (TM 117C), Engineered Metal Finishing & Performance Coatings, 1 Page. Retrieved from Webpage: https://techmetals.com/pdfs/TM_117C.pdf https://techmetals.com/tm117c-2/.

Telsonic Ultrasonics, Cutting Awning Fabrics and Sealing the Edge, The Powerhouse of Ultrasonics, 2017, 1 Page. https://www.telsonic.com/fileadmin/applications/AS_206_Cut_Seal_Markisengewebe_EN.pdf.

Telsonic Ultrasonics, Integrated Power Actuator—IPA 3505, Telsonic Ultrasonics, Retrieved Jun. 26, 2020, 2 Pages. https://www.telsonic.com/en/products/integrated-power-actuator-ipa-3505/.

Tok et al., Tape Casting of High Dielectric Ceramic Substrates for Microelectronics Packaging, Journal of Materials Engineering and Performance, vol. 8, 1999, pp. 469-472. (Abstract Only) https://link.springer.com/article/10.1361/105994999770346783.

Wikipedia, Pixel Shifting, 2 Pages. Retrieved Mar. 30, 2021 from Webpage: https://en.wikipedia.org/wiki/Pixel_shifting.

Wikipedia, Standing Wave, 11 Pages. Retrieved Mar. 17, 2021 from Webpage: https://en.wikipedia.org/wiki/Standing_wave.

* cited by examiner

SYSTEMS AND METHODS FOR ADDITIVE MANUFACTURING

CROSS-REFERENCE TO RELATED APPLICATION

This application is a non-provisional application claiming the benefit of priority under 35 U.S.C. § 119(e) to U.S. Provisional Application No. 63/180,319, filed Apr. 27, 2021, which is hereby incorporated by reference in its entirety.

FIELD

The present subject matter relates generally to an additive manufacturing apparatus, and more particularly to assemblies for altering positions of various components of the additive manufacturing apparatus.

BACKGROUND

Additive manufacturing is a process in which material is built up layer-by-layer to form a component. Stereolithography (SLA) is a type of additive manufacturing process, which employs a tank of radiant-energy curable photopolymer "resin" and a curing energy source such as a laser. Similarly, Digital Light Processing (DLP) three-dimensional (3D) printing employs a two-dimensional image projector to build components one layer at a time. For each layer, the energy source draws or flashes a radiation image of the cross section of the component onto the surface of the resin. Exposure to the radiation cures and solidifies the pattern in the resin and joins it to a previously-cured layer.

In some instances, additive manufacturing may be accomplished through a "tape casting" process. In this process, a resin is deposited onto a flexible radiotransparent resin support, such as a tape or foil, that is fed out from a supply reel to a build zone. Radiant energy is produced from a radiant energy device and directed through a window to cure the resin to a component that is supported by a stage in the build zone. Once the curing of the first layer is complete, the stage and the resin support are separated from one another. The resin support is then advanced and fresh resin is provided to the build zone. In turn, the first layer of the cured resin is placed onto the fresh resin and cured through the energy device to form an additional layer of the component. Subsequent layers are added to each previous layer until the component is completed.

The tape casting process may be used to form various components. However, the components may be relatively small in size. Accordingly, it may be beneficial for at least one of the radiant energy device or the stage may be movable relative to the window to create larger components.

BRIEF DESCRIPTION

Aspects and advantages of the invention will be set forth in part in the following description, or may be obvious from the description, or may be learned through practice of the invention.

In some embodiments of the present disclosure, an additive manufacturing apparatus includes a support plate defining a window. A resin support is configured to support an uncured layer of resin. A stage is configured to hold one or more cured layers of the resin to form a component positioned opposite the support plate. A radiant energy device is positioned on an opposite side of the resin support from the stage and is operable to generate and project radiant energy in a patterned image through the window. The stage is configured to move simultaneously with the resin support from a first position to a second position in an X-axis direction.

In some embodiments of the present disclosure, a method of operating an additive manufacturing apparatus is provided herein. The method includes depositing a layer of a resin onto a resin support. The method also includes moving a stage in a Z-axis direction such that a working surface contacts the layer of the resin. In addition, the method includes curing a first portion of the resin while the stage and the resin support are in a first position relative to a window by applying radiant energy from a radiant energy device through the window. The method further includes translating the stage and the resin support simultaneously along the window in an X-axis direction. Lastly, the method includes curing a second portion of the resin while the stage and the resin support are in a second position relative to the window by applying radiant energy from the radiant energy device through the window.

In some embodiments of the present disclosure, an additive manufacturing apparatus includes a drive assembly configured to translate a resin support along a support plate in an X-axis direction. A stage is configured to hold a component. A radiant energy device is positioned on an opposite side of the resin support from the stage and is operable to generate and project radiant energy in a patterned image. An actuator assembly is configured to move the stage in the X-axis direction. A computing system is configured to actuate the drive assembly and the actuator to translate the stage from a first position to a second position in the X-axis direction simultaneously with the resin support.

These and other features, aspects, and advantages of the present disclosure will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present disclosure, including the best mode thereof, directed to one of ordinary skill in the art, is set forth in the specification, which makes reference to the appended figures.

Figure 1A:
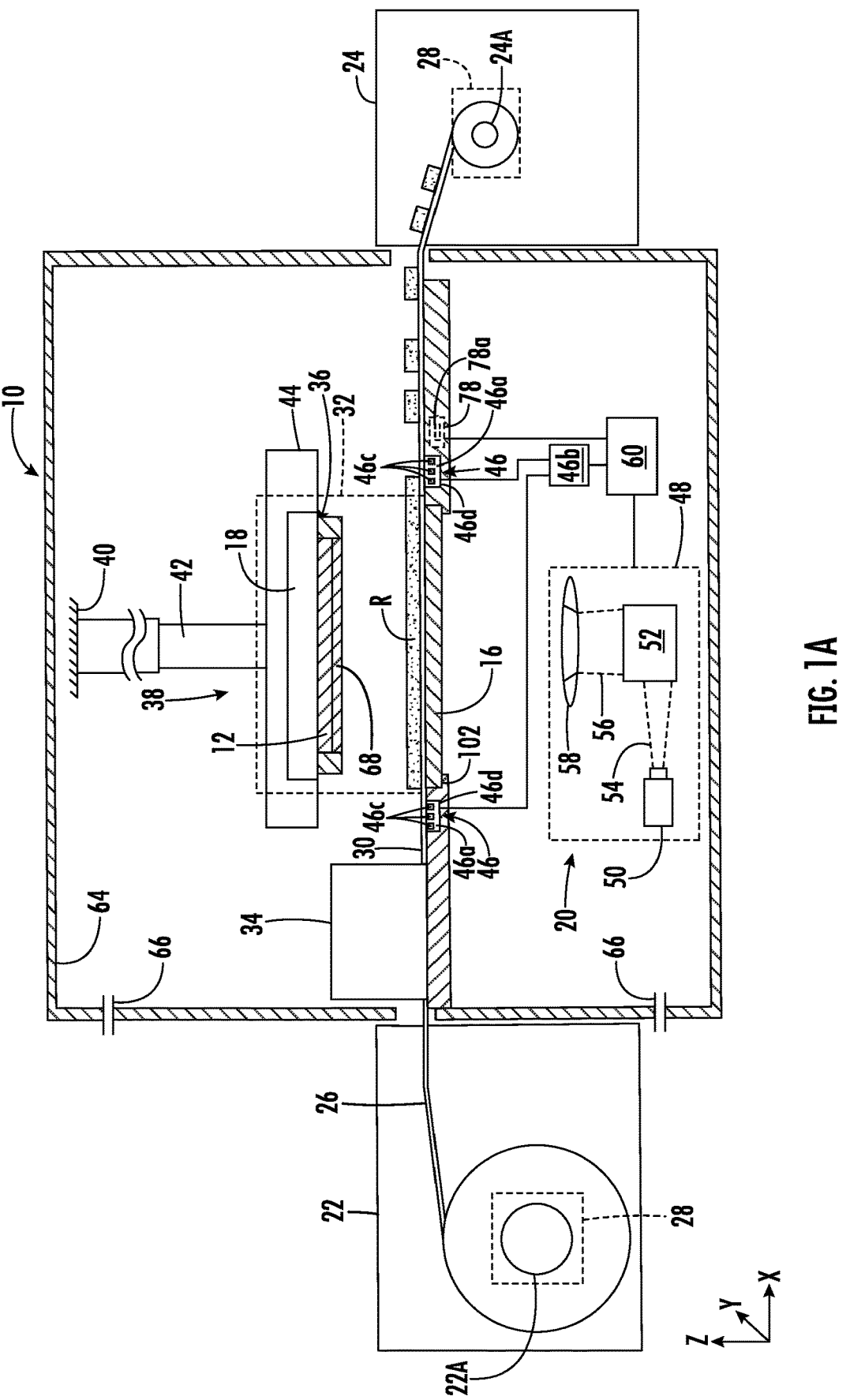
FIG. 1A is a schematic side view of an additive manufacturing apparatus in accordance with various aspects of the present disclosure.

Repeat use of reference characters in the present specification and drawings is intended to represent the same or analogous features or elements of the present disclosure.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein. The terms "upstream" and "downstream" refer to the relative direction with respect to a resin support movement along the manufacturing apparatus. For example, "upstream" refers to the direction from which the resin support moves, and "downstream" refers to the direction to which the resin support moves. The term "selectively" refers to a component's ability to operate in various states (e.g., an ON state and an OFF state) based on manual and/or automatic control of the component.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

The present disclosure is generally directed to an additive manufacturing apparatus that implements various manufacturing processes such that successive layers of material(s) are provided on each other to "build-up," layer-by-layer, a three-dimensional component. The successive layers generally cure together to form a monolithic component which may have a variety of integral sub-components. Although additive manufacturing technology is described herein as enabling the fabrication of complex objects by building objects point-by-point, layer-by-layer, variations of the described additive manufacturing apparatus and technology are possible and within the scope of the present subject matter.

The additive manufacturing apparatus can include a support plate, a window supported by the support plate, and a stage moveable relative to the window. The additive manufacturing apparatus can further include a resin that is deposited as a layer having a desired thickness onto a resin support (such as a foil, tape, vat, plate, etc.) that is fed out from a supply reel. A stage lowers onto the resin such that a working surface defined by one of a surface of the stage or a surface of the work in process component is positioned such that the working surface either is just touching the resin or compressing it between the resin support and the stage and defining a layer thickness. Radiant energy is used to cure the resin through the resin support. Once the curing of the first layer is complete, the stage is retracted, taking the cured material with the stage. The resin support is then advanced to expose a fresh clean section, ready for additional resin to be deposited in a subsequent, new cycle.

In some instances, the stage is moveable through an actuator assembly. The actuator assembly may be capable of moving the stage away from the window (e.g., a Z-axis direction) and/or along the window (e.g., an X-axis direction). In such instances, the stage may be lowered onto the resin and the radiant energy device may cure a first portion of resin. The actuator assembly then may move the stage simultaneously with the resin support while maintaining contact with the resin support from a first position to a second position. Once the stage and the resin support are moved to the second position, the radiant energy device may cure a second portion of the resin.

In various examples, the radiant energy device may move in a third direction (e.g., Y-axis direction) and multiple curing steps may be completed while the stage and the resin support are in a fixed position relative to one another. In other embodiments, the stage may be detached from the resin R and move relative to the resin support before recontacting with the resin R on the resin support. Additionally or alternatively, in some embodiments, the stage and the component may be simultaneously moved from a first position to a second position while the resin support stays generally stationary.

By moving the stage and/or the radiant energy device in various directions, larger components may be produced, which may be accomplished through multiple curing steps with a single layer of the component. The larger components may enhance the capabilities of the manufacturing apparatus by allowing for more diverse part creations and/or reduce the overall packaging of the apparatus.

Figure 1B:
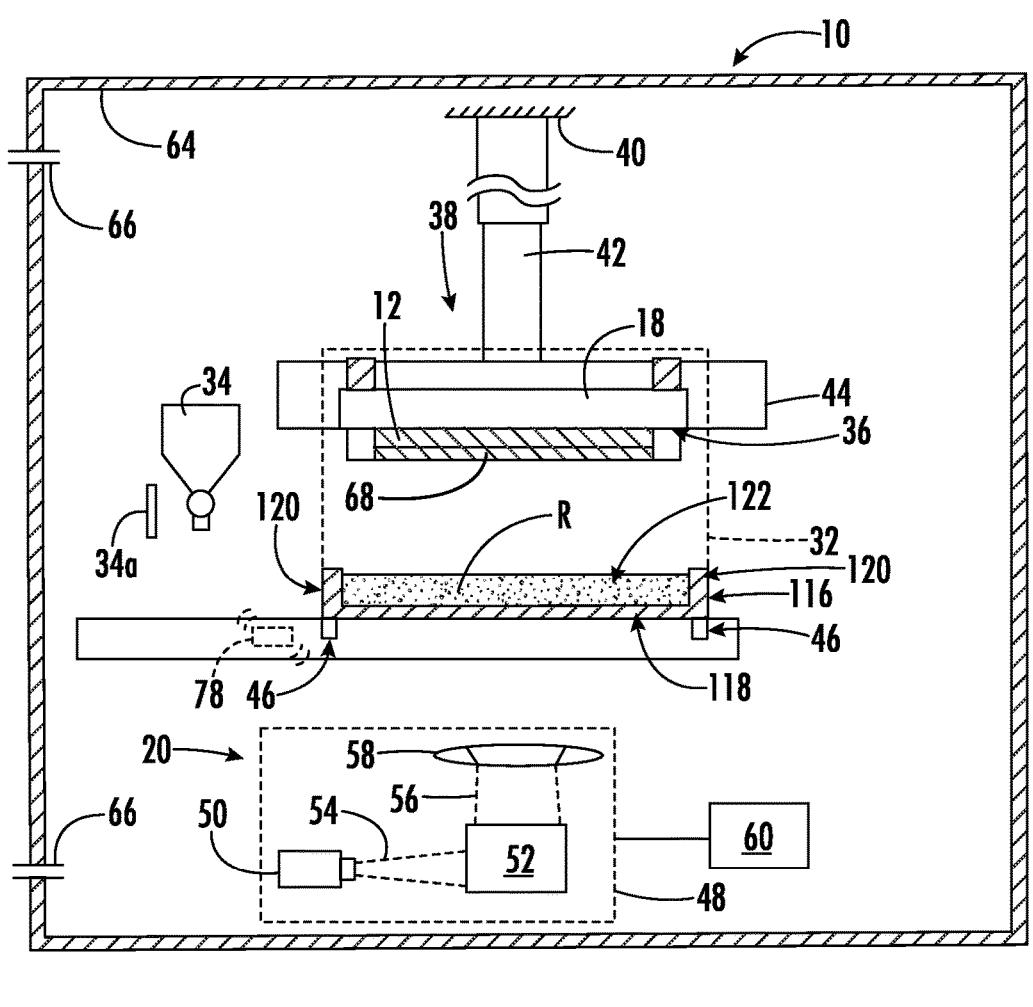
FIG. 1B is a schematic side view of an additive manufacturing apparatus in accordance with various aspects of the present disclosure.

Referring to the drawings wherein identical reference numerals denote the similar elements throughout the various views, FIGS. 1A and 1B schematically illustrate an example of one type of suitable apparatus 10 for forming a component 12 created through one or more layers of cured resin R. The apparatus 10 can include one or more of a support plate 14, a window 16, a stage 18 that is movable relative to window 16, and a radiant energy device 20, which, in combination, may be used to form any number (e.g., one or more) of additively manufactured components 12.

In the illustrated example of FIG. 1A, the apparatus 10 includes a feed module 22, which may include a first roller 22A, and a take-up module 24, which may include a second roller 24A, that are spaced-apart with a resin support 26 extending therebetween. A portion of the resin support 26 can be supported from underneath by the support plate 14. Suitable mechanical supports (frames, brackets, etc.) and/or alignment devices may be provided for the rollers 22A, 24A and the support plate 14. The first roller 22A and/or the second roller 24A can be configured to control the speed and direction of the resin support 26 such that the desired tension and speed is maintained in the resin support 26 through a drive system 28. By way of example and not limitation, the drive system 28 can be configured as individual motors associated with the first roller 22A and/or the second roller 24A. Moreover, various components, such as motors, actuators, feedback sensors, and/or controls can be provided for driving the rollers 22A, 24A in such a manner so as to maintain the resin support 26 tensioned between the aligned rollers 22A, 24A and to wind the resin support 26 from the first roller 22A to the second roller 24A.

In various embodiments, the window 16 is transparent and can be operably supported by the support plate 14. Further, the window 16 and the support plate 14 can be integrally formed such that one or more windows 16 are integrated within the support plate 14. Likewise, the resin support 26 is also transparent or includes portions that are transparent. As used herein, the terms "transparent" and "radiotransparent" refer to a material that allows at least a portion of radiant energy of a selected wavelength to pass through. For example, the radiant energy that passes through the window 16 and the resin support 26 can be in the ultraviolet spectrum, the infrared spectrum, the visible spectrum, or any other practicable radiant energy. Non-limiting examples of transparent materials include polymers, glass, and crystalline minerals, such as sapphire or quartz.

The resin support 26 extends between the feed module 22 and the take-up module 24 and defines a "build surface" 30, which is shown as being planar, but could alternatively be arcuate (depending on the shape of the support plate 14). In some instances, the build surface 30 may be defined by the resin support 26 and be positioned to face the stage 18 with the window 16 on an opposing side of the resin support 26 from the stage 18. For purposes of convenient description, the build surface 30 may be considered to be oriented parallel to an X-Y plane of the apparatus 10, and a direction perpendicular to the X-Y plane is denoted as a Z-axis direction (X, Y, and Z being three mutually perpendicular directions). As used herein, the X-axis refers to the machine direction along the length of the resin support 26. As used herein, the Y-axis refers to the transverse direction across the width of the resin support 26 and generally perpendicular to the machine direction. As used herein, the Z-axis refers to the stage direction that can be defined as the direction of movement of the stage 18 relative to the window 16.

The build surface 30 may be configured to be "non-stick," that is, resistant to adhesion of a cured resin R. The non-stick properties may be embodied by a combination of variables such as the chemistry of the resin support 26, its surface finish, and/or applied coatings. For instance, a permanent or semi-permanent non-stick coating may be applied. One non-limiting example of a suitable coating is polytetrafluoroethylene ("PTFE"). In some examples, all or a portion of the build surface 30 may incorporate a controlled roughness or surface texture (e.g. protrusions, dimples, grooves, ridges, etc.) with nonstick properties. Additionally or alternatively, the resin support 26 may be made in whole or in part from an oxygen-permeable material.

For reference purposes, an area or volume immediately surrounding the location of the resin support 26 and the window 16 or transparent portion defined by the support plate 14 may be defined as a "build zone," labeled 32.

In some instances, a material depositor 34 may be positioned along the resin support 26 and can include a reservoir. The material depositor 34 may be any device or combination of devices that is operable to apply a layer of resin R on the resin support 26. The material depositor 34 may optionally include a device or combination of devices to define a height of the resin R on the resin support 26 and/or to level the resin R on the resin support 26. Nonlimiting examples of suitable material deposition devices include chutes, rollers, hoppers, pumps, spray nozzles, spray bars, or printheads (e.g. inkjets). In some examples, a doctor blade may be used to control the thickness of resin R applied to the resin support 26 as the resin support 26 passes the material depositor 34.

In the illustrated example of FIG. 1B, the resin support may be in the form of a vat 116 that is configured to isolate debris that could contaminate the build from usable resin R. The vat 116 may include a floor 118 and a perimeter wall 120. The perimeter wall 120 extends from the floor 118. Inner surfaces of the floor 118 and the perimeter wall 120 define a receptacle 122 for receiving the resin R.

A drive system may be provided for moving the vat 116 relative to the stage 18 parallel to the X-direction between a build zone 32 and a position at least partially external to the build zone 32. However, it will be appreciated that, in other embodiments, the resin support 26 may be stationary without departing from the scope of the present disclosure.

In some instances, the resin support 26 may be positioned to accept a resin R from a material depositor 34 is operable to introduce a layer of resin R into the resin support. The material depositor 34 may optionally include a device or combination of devices to define a height in the resin and/or to level the resin R. Nonlimiting examples of suitable material deposition devices include chutes, hoppers, pumps, spray nozzles, spray bars, or printheads (e.g. inkjets).

Referring back to FIGS. 1A and 1B, the resin R includes any radiant-energy curable material, which is capable of adhering or binding together the filler (if used) in the cured state. As used herein, the term "radiant-energy curable" refers to any material which solidifies or partially solidifies in response to the application of radiant energy of a particular frequency and energy level. For example, the resin R may include a photopolymer resin containing photo-initiator compounds functioning to trigger a polymerization reaction, causing the resin R to change from a liquid (or powdered) state to a solid state. Alternatively, the resin R may include a material that contains a solvent that may be evaporated out by the application of radiant energy. The uncured resin R may be provided in solid (e.g. granular) or liquid form, including a paste or slurry.

Furthermore, the resin R can have a relatively high viscosity resin that will not "slump" or run off during the build process. The composition of the resin R may be selected as desired to suit a particular application. Mixtures of different compositions may be used. The resin R may be selected to have the ability to out-gas or burn off during further processing, such as a sintering process.

Additionally or alternatively, the resin R may be selected to be a viscosity reducible composition. These compositions reduce in viscosity when a shear stress is applied or when they are heated. For example, the resin R may be selected to be shear-thinning such that the resin R exhibits reduced viscosity as an amount of stress applied to the resin R increases. Additionally or alternatively, the resin R may be selected to reduce in the viscosity as the resin R is heated.

The resin R may incorporate a filler. The filler may be pre-mixed with resin R, then loaded into the material depositor 34. Alternatively, the filler may be mixed with the resin R on the apparatus 10. The filler includes particles, which are conventionally defined as "a very small bit of matter." The filler may include any material that is chemically and physically compatible with the selected resin R. The particles may be regular or irregular in shape, may be uniform or non-uniform in size, and may have variable aspect ratios. For example, the particles may take the form of powder, of small spheres or granules, or may be shaped like small rods or fibers.

The composition of the filler, including its chemistry and microstructure, may be selected as desired to suit a particular application. For example, the filler may be metallic, ceramic, polymeric, and/or organic. Other examples of potential fillers include diamond, silicon, and graphite. Mixtures of different compositions may be used. In some examples, the filler composition may be selected for its electrical or electromagnetic properties, e.g. it may specifically be an electrical insulator, a dielectric material, an electrical conductor, and/or magnetic.

The filler may be "fusible," meaning it is capable of consolidation into a mass upon via application of sufficient energy. For example, fusibility is a characteristic of many available powders including but not limited to polymeric, ceramic, glass, and metallic. The proportion of filler to resin R may be selected to suit a particular application. Generally, any amount of filler may be used so long as the combined material is capable of flowing and being leveled, and there is sufficient resin R to hold together the particles of the filler in the cured state.

The stage 18 is a structure defining a planar surface 36, which is capable of being oriented parallel to the build surface 30 or the X-Y plane. Various devices may be provided for moving the stage 18 relative to the window 16 parallel to the Z-axis direction. For example, as illustrated in FIGS. 1A and 1B, the movement may be provided through an actuator assembly 38 that may be coupled with a static support 40. In some embodiments, the actuator assembly 38 may include a vertical actuator 42 between the stage 18 and the static support 40 that allows for movement of the stage 18 in a first, vertical direction (e.g., along the Z-axis direction). The actuator assembly 38 may additionally or alternatively include a lateral actuator 44 between the stage 18 and the vertical actuator 42 and/or the static support 40 that allows for movement in a second, horizontal direction (e.g., along the X-axis direction). In some embodiments, the vertical actuator 42 may be operably coupled with the lateral actuator 44 such that the stage 18 and vertical actuator 42 move along the lateral actuator 44 simultaneously. The actuator assembly 38 may include any device practicable of moving the stage 18 in the first and/or second direction, such as ballscrew electric actuators, linear electric actuators, pneumatic cylinders, hydraulic cylinders, delta drives, belt systems, or any other practicable device.

The radiant energy device 20 may be configured as any device or combination of devices operable to generate and project radiant energy at the resin R in a suitable pattern and with a suitable energy level and other operating characteristics to cure the resin R during the build process. For example, as shown in FIGS. 1A and 1B, the radiant energy device 20 may include a projector 48, which may generally refer to any device operable to generate a radiant energy predetermined patterned image of suitable energy level and other operating characteristics to cure the resin R. As used herein, the term "patterned image" refers to a projection of radiant energy comprising an array of one or more individual pixels. Non-limiting examples of patterned image devices include a DLP projector or another digital micromirror device, a two-dimensional array of LEDs, a two-dimensional array of lasers, and/or optically addressed light valves. In the illustrated example, the projector 48 includes a radiant energy source 50 such as a UV lamp, an image forming apparatus 52 operable to receive a source beam 54 from the radiant energy source 50 and generate a patterned image 56 to be projected onto the surface of the resin R, and optionally focusing optics 58, such as one or more lenses.

The image forming apparatus 52 may include one or more mirrors, prisms, and/or lenses and is provided with suitable actuators, and arranged so that the source beam 54 from the radiant energy source 50 can be transformed into a pixelated image 56 in an X-Y plane coincident with the surface of the resin R. In the illustrated example, the image forming apparatus 52 may be a digital micro-mirror device.

The projector 48 may incorporate additional components, such as actuators, mirrors, etc. configured to selectively move the image forming apparatus 52 or other part of the projector 48 with the effect of rastering or shifting the location of the patterned image 56 on the build surface 30. Stated another way, the patterned image 56 may be moved away from a nominal or starting location.

In addition to other types of radiant energy devices 20, the radiant energy device 20 may include a "scanned beam apparatus" used herein to refer generally to any device operable to generate a radiant energy beam of suitable energy level and other operating characteristics to cure the resin R and to scan the beam over the surface of the resin R in a desired pattern. For example, the scanned beam apparatus can include a radiant energy source 50 and a beam steering apparatus. The radiant energy source 50 may include any device operable to generate a beam of suitable power and other operating characteristics to cure the resin R. Non-limiting examples of suitable radiant energy sources 50 include lasers or electron beam guns.

In some instances, the apparatus 10 may include a material retention assembly 46 that may be configured to retain the resin support 26 in a predefined position along the support plate. In some instances, the material retention assembly 46 can include one or more pneumatic actuation zones 46a with each pneumatic actuation zone 46a configured to selectively interact with the resin support 26 by producing a force on a surface of the resin support 26 opposite the resin R.

The one or more pneumatic actuation zones 46a may apply a negative pressure on a first surface of the resin support 26 that is opposite to the resin R, or a second side of the resin support 26, to produce a suction or vacuum on the resin support 26. The negative pressure may retain the resin support 26 in a desired position along the support plate 14. The one or more pneumatic actuation zones 46a may also apply a positive pressure on the first surface of the resin support 26 that is opposite to the resin R, or a second side of the resin support 26, to produce a pushing force on the resin support 26. The positive pressure may release the resin support 26 from a component of the apparatus 10, such as the window 16, the material retention assembly 46, etc. As used herein, a "negative" pressure is any pressure that is less than an ambient pressure proximate to one or more pneumatic actuation zones 46a such that fluid may be drawn into the one or more pneumatic actuation zones 46a. Conversely, a "positive" pressure is any pressure that is greater than an ambient pressure proximate to one or more pneumatic actuation zones 46a such that fluid may be exhausted from the one or more pneumatic actuation zones 46a. Further, a "neutral" pressure is any pressure that is generally equal to an ambient pressure proximate to one or more pneumatic actuation zones 46a.

In some examples, the pneumatic actuation zones 46a may be fluidly coupled with a pneumatic assembly 46b through various hoses and one or more ports. The pneumatic assembly 46b may include any device capable of providing a vacuum/suction and/or pushing a fluid, such as air or a process gas (e.g., nitrogen or argon), through the one or more pneumatic actuation zones 46a. For instance, the pneumatic assembly 46b may include a pressurized fluid source that includes a compressor and/or a blower. The pneumatic assembly 46b may additionally or alternatively include any assembly capable of altering a pressure, such as a venturi vacuum pump. In some embodiments, one or more valves and/or switches may be coupled with the pneumatic assembly 46b and the one or more pneumatic actuation zones 46a. The one or more valves and/or switches are configured to regulate a pressure to each of the one or more pneumatic actuation zones 46a.

In some embodiments, the pneumatic actuation zone 46a that includes one or more apertures 46c of any size and shape for interacting with the resin support 26. For instance, the apertures 46c may be any number and combination of holes, slits, or other geometric shapes defined by any component of the additive manufacturing apparatus 10, such as a portion of the support plate 14. Additionally, or alternatively, the apertures 46c may be defined by a portion of the support plate 14 being formed from a porous material, or through any other assembly in which a fluid may be moved from a first side of the support plate 14 to a second side of the support plate 14 to interact with the resin support 26.

In some examples, the pneumatic actuation zone 46a may be defined by a plenum 46d. The plenum 46d may be of any size and may be similar or varied from the shape of any remaining plenums 46d. In some instances, a gasket may be positioned about a rim of the plenum 46d. Additionally or alternatively, the material retention assembly 46 may include one or more clamps that compressively maintain the resin support 26 along the support plate 14.

With further reference to FIGS. 1A and 1B, a viscosity modification assembly 78 may be integrated within the support plate 14 and/or otherwise operably coupled with resin support 26. The viscosity modification assembly 78 may be configured to apply a shearing stress to the resin R to alter (e.g., reduce) a viscosity of the resin R. Additionally or alternatively, the viscosity modification assembly 78 may be configured to heat the resin R to alter the viscosity of the resin R. It will be appreciated that in embodiments that heat the resin R to alter the viscosity of the resin R, the heat provided may be within a predefined range that is sufficient to alter the viscosity of the resin R without causing any cross-linking in the polymer.

In some embodiments, the viscosity modification assembly 78 may be configured to mechanically vibrate a portion of the support plate 14 to create a shearing stress on the resin R. For example, the viscosity modification assembly 78 may include a movement device 78a (e.g., a transducer) that is operably coupled with the support plate 14. The movement device 78a may be configured to vibrate at least a portion of the support plate 14 or any other module of the apparatus 10 that is then transferred to the resin R. Additionally and/or alternatively, the movement device 78a may be configured to convert electrical energy to ultrasonic mechanical pressure waves that are transferred to the resin R. For instance, the movement device 78a may be in the form of an ultrasonic vibrating device, such as one utilizing a piezoelectric transducer. In other embodiments, the viscosity modification assembly 78, in addition to or in lieu of the transducer, may include, alone or in conjunction with one or the other, a fluid, an acoustic, a motor (e.g., offset cam), a reciprocating piston, or any other movement device 78a.

The movement device 78a may be operably coupled with the computing system 60. The computing system 60 may include a signal generator 78b (FIG. 2A) that supplies an electric impulse to the movement device 78a, the voltage of which can be varied at different frequencies and with different waveshapes. The signal may, for example, be a pure sinusoidal wave or may be modulated with one or more other frequencies. Alternatively, the signal may be a stepped or spiked pulse. In some embodiments, the signal generator 78b transmits a signal of between 20-80 kHz. For example, the signal is at about 60 kHz. The signal generator 78b may, for example, transmit a constant amplitude signal at a constant frequency, or alternate one or both of these parameters. A power level can be selected as a percentage of maximum power.

In other embodiments, the viscosity modification assembly 78 may be configured to create a shearing stress on the resin R through other configurations without departing from the scope of the present disclosure. For example, the viscosity modification assembly 78 may be configured as a probe that may be adjacent and in physical contact with the resin support 26 and/or any other module that may relay the shearing stress to the resin R on the resin support 26. Additionally or alternatively, the viscosity modification assembly 78 may be configured as an ultrasonic or vibration plate that may be operably coupled with the resin support 26 and/or any other module of the apparatus 10 that may provide the shearing stress to the resin R on the resin support 26.

With further reference to FIGS. 1A and 1B, in various embodiments, a gasket 102 may be positioned between the window 16 and the support plate 14 to isolate movement of each of the window 16 and the support plate 14 from one another. By isolating movement of the window 16 from the support plate 14, degradation issues of the apparatus 10 caused through operation of viscosity modification assembly 78 may be mitigated. In various examples, the gasket 102 may be formed from a motion attenuating material, such as any of a wide variety of resilient elastomers including, but not limited to, materials containing natural rubber and silicone.

As provided herein, in some instances, the viscosity modification assembly 78 may additionally or alternatively be capable of producing heat to alter the viscosity of the resin R. For example, fast heating processes, such as dielectric or microwave heating, can be used to avoid exposing the resin R to a long heating cycle before the temperature of use is reached.

The computing system 60 in FIGS. 1A and 1B is a generalized representation of the hardware and software that may be implemented to control the operation of the apparatus 10, including some or all of the stage 18, the drive system 28, the radiant energy device 20, the actuator assembly 38, the material retention assembly 46, the viscosity modification assembly 78, a movement device 62 (FIG. 3), actuators, and the various parts of the apparatus 10 described herein. The computing system 60 may be embodied, for example, by software running on one or more processors embodied in one or more devices such as a programmable logic controller ("PLC") or a microcomputer. Such processors may be coupled to process sensors and operating components, for example, through wired or wireless connections. The same processor or processors may be used to retrieve and analyze sensor data, for statistical analysis, and for feedback control. Numerous aspects of the apparatus 10 may be subject to closed-loop control.

Optionally, the components of the apparatus 10 may be surrounded by a housing 64, which may be used to provide a shielding or inert gas (e.g., a "process gas") atmosphere using gas ports 66. Optionally, pressure within the housing 64 could be maintained at a desired level greater than or less than atmospheric. Optionally, the housing 64 could be temperature and/or humidity controlled. Optionally, ventilation of the housing 64 could be controlled based on factors such as a time interval, temperature, humidity, and/or chemical species concentration. In some embodiments, the housing 64 can be maintained at a pressure that is different than an atmospheric pressure.

Referring to FIGS. 2A-2D, schematic views of the viscosity modification assembly 78 at various times during operation of the apparatus 10 are schematically illustrated. In general, the viscosity modification assembly 78 may be configured to alter a first viscosity of the resin R to a second viscosity by applying a shear stress to the resin R. Moreover, the shear stress may be applied to the resin R prior to the radiant energy device 20 projecting energy in a predetermined pattern onto the resin R and/or after the radiant energy device 20 projects energy in a predetermined pattern onto the resin R. In several embodiments, the viscosity modification assembly 78 ceases operation as the radiant energy device 20 projects energy in a predetermined pattern onto the resin R. As provided herein, the frequency and amplitude that the viscosity modification assembly 78 induces may be tuned based on the component 12, the resin R, the apparatus 10, and/or any other factor.

Figure 2A:
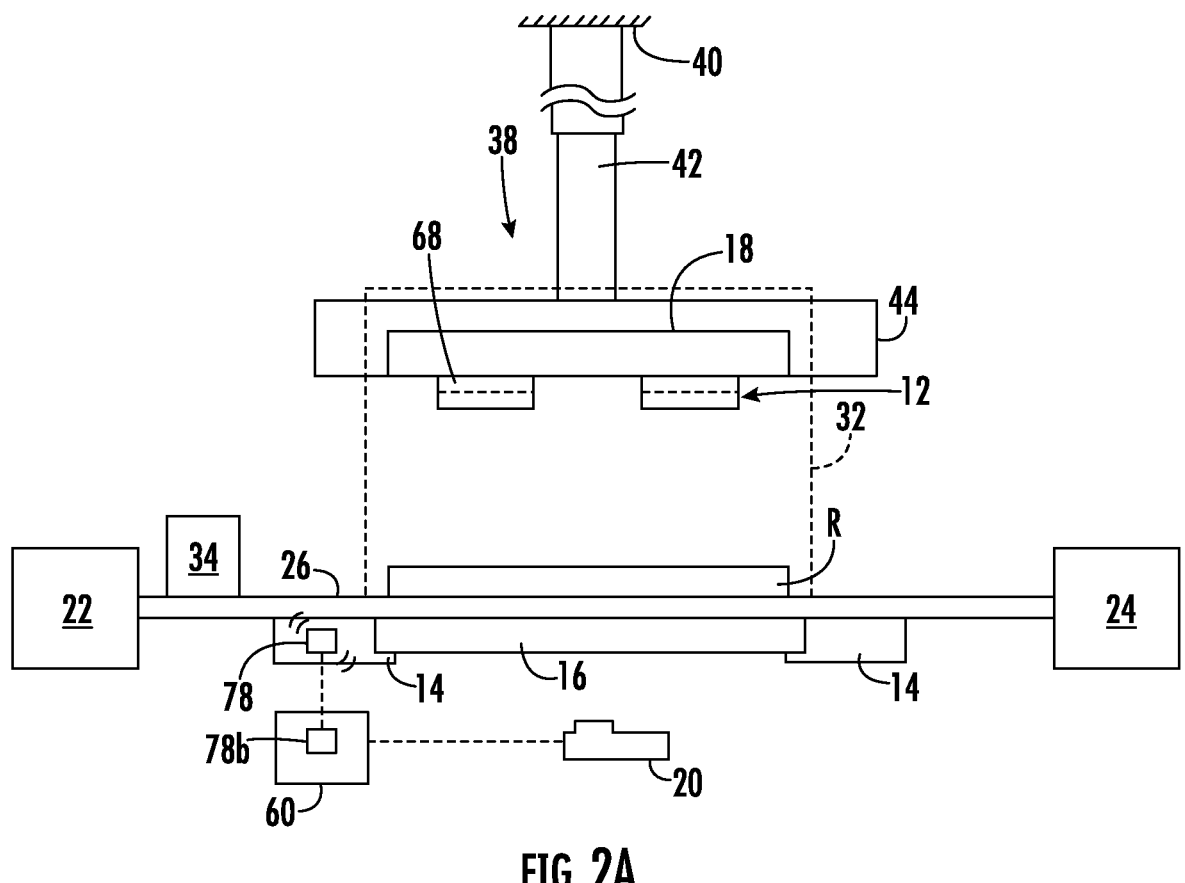
FIGS. 2A-2D illustrated schematic views of a viscosity modification assembly during operation of the apparatus in accordance with various aspects of the present disclosure.

As illustrated in FIG. 2A, the viscosity modification assembly 78 may apply a shear stress to the resin R while the resin R in translated into the build zone 32. In some examples, as the viscosity is reduced, any trapped bubbles within the resin R may be released.

Figure 2B:
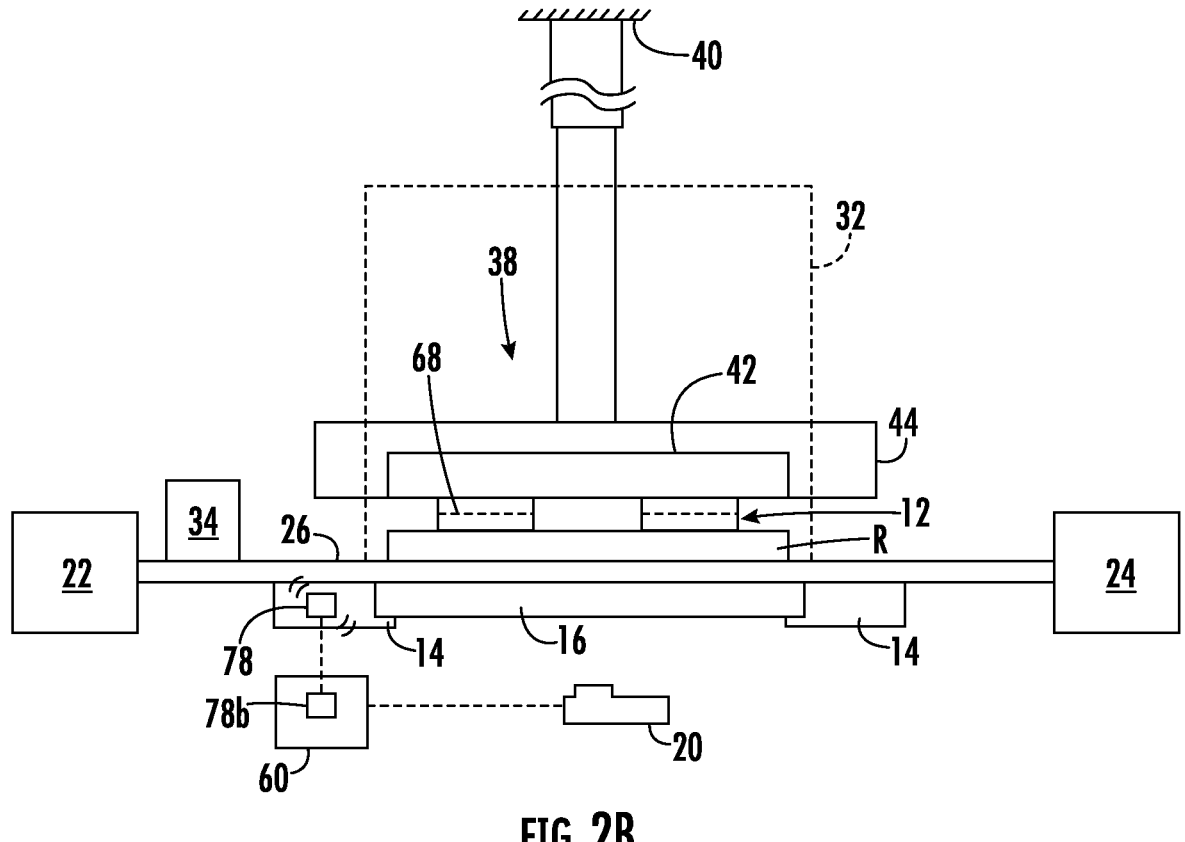

Additionally or alternatively, the viscosity modification assembly 78 may apply a shear stress to the resin R while the support plate 14 is translated along the z-direction by the actuator 42. Further, as illustrated in FIG. 2B, the shear stress may continue to be applied to the resin R as the working surface of the stage 18 and/or the component 12 retained by the stage 18 contacts the resin R. In other embodiments, the viscosity modification assembly 78 may begin to apply a shear stress to the resin R prior to the component 12 contacting the resin R, which may be based on the stage 18 or the component 12 being within a predefined distance of the resin R and/or a predicted time until the stage 18 or the component 12 are to contact the resin R. In some instances, the application of a shear stress to the resin R may continue until the translation of the stage 18 ceases with a predefined layer increment defined and/or any other condition is met. With high viscosity resins, previously printed layers may deform as the support plate 14 presses down to the correct height to cure the next layer. As such, through actuation of the viscosity modification assembly 78, the viscosity may be reduced leading to an increase in component quality and accuracy.

Figure 2C:
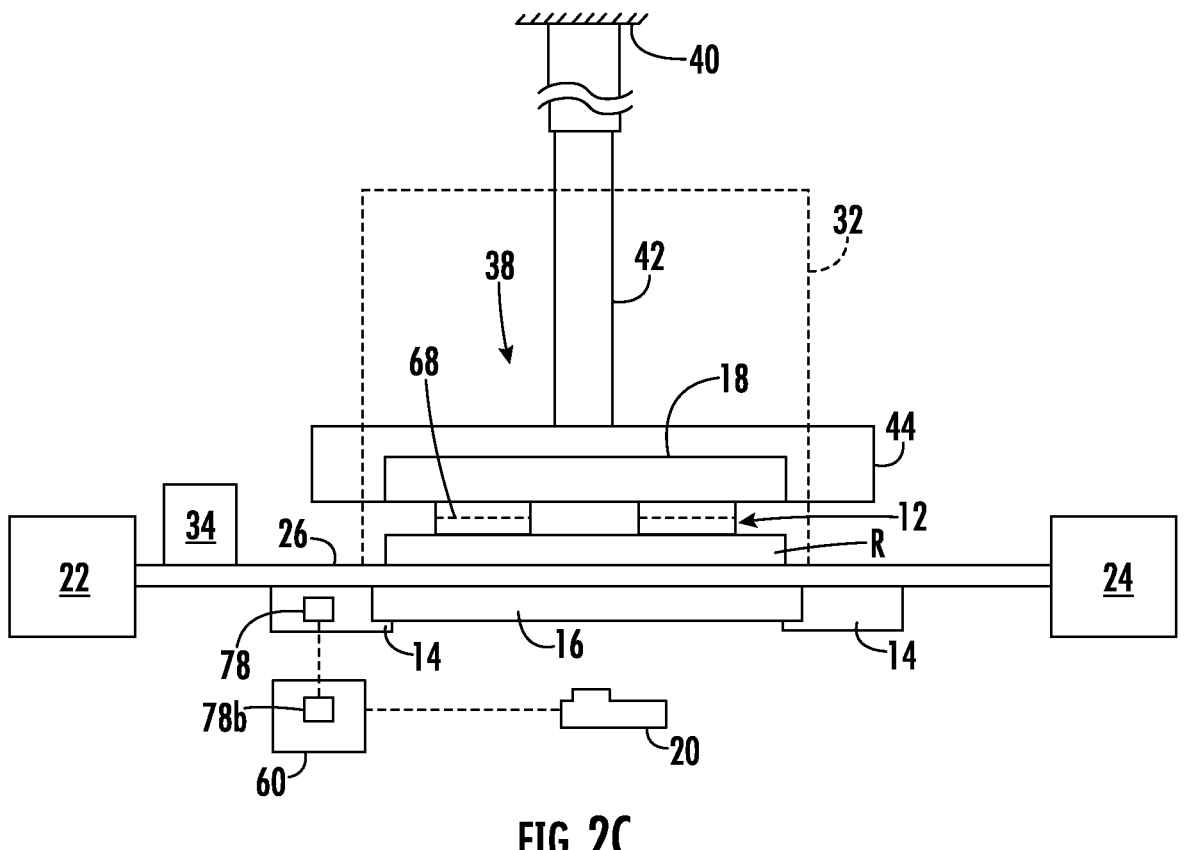

As illustrated in FIG. 2C, in some embodiments, the viscosity modification assembly 78 may cease operation prior to the radiant energy device 20 curing various portions of the resin R to form a layer 68 of the component 12. As provided herein, each layer 68 may be formed by the radiant energy device 20 by emitting one or more discrete patterned images 56 at the resin R. In some instances, by ceasing operation of the movement device 114 during the use of the radiant energy device 20, the apparatus 10 may ensure that the projected image aligns with a predefined location within the build zone 32.

Figure 2D:
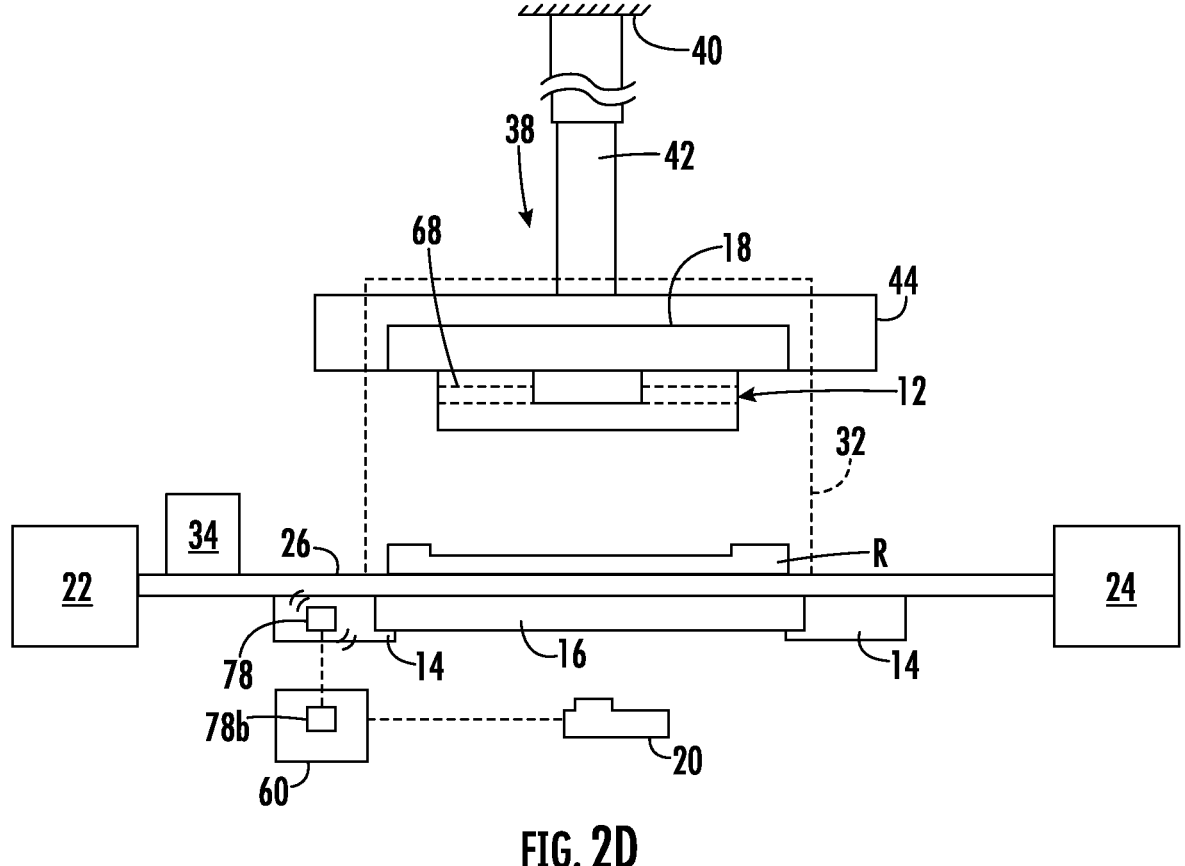

Additionally or alternatively, as illustrated in FIG. 2D, once the radiant energy device 20 has cured various portions of the resin R to form a layer 68 of the component 12 by emitting one or more discrete patterned images 56 at the resin R, the viscosity modification assembly 78 may begin actuating. In some instances, through operation of the viscosity modification assembly 78, the amount of separation force between the component 12, with the new layer attached thereto, and the resin R remaining on the resin support 26 and/or the resin support 26 may be decreased. As such, through actuation of the viscosity modification assembly 78 during the separation of the component 12 from the resin R remaining on the resin support 26 and/or the resin support 26, component quality may be increased and/or less breakage may occur. Accordingly, in various embodiments, the viscosity modification assembly 78 may be operated any time the actuator 42 moves the stage 18.

In some embodiments, the viscosity modification assembly 78 may be integrated within and/or operably coupled with the stage 18 such that the printed component 12 itself can induce the shearing stress in the resin R to cause the viscosity of the resin R change. Moreover, in various embodiments, the viscosity modification assembly 78 may be configured to target specific locations in the build zone 32. As such, by taking advantage of constructive and destructive wave interference vibration caused by the viscosity modification assembly 78 can be targeted to specific locations within the build zone 32.

Figure 3:
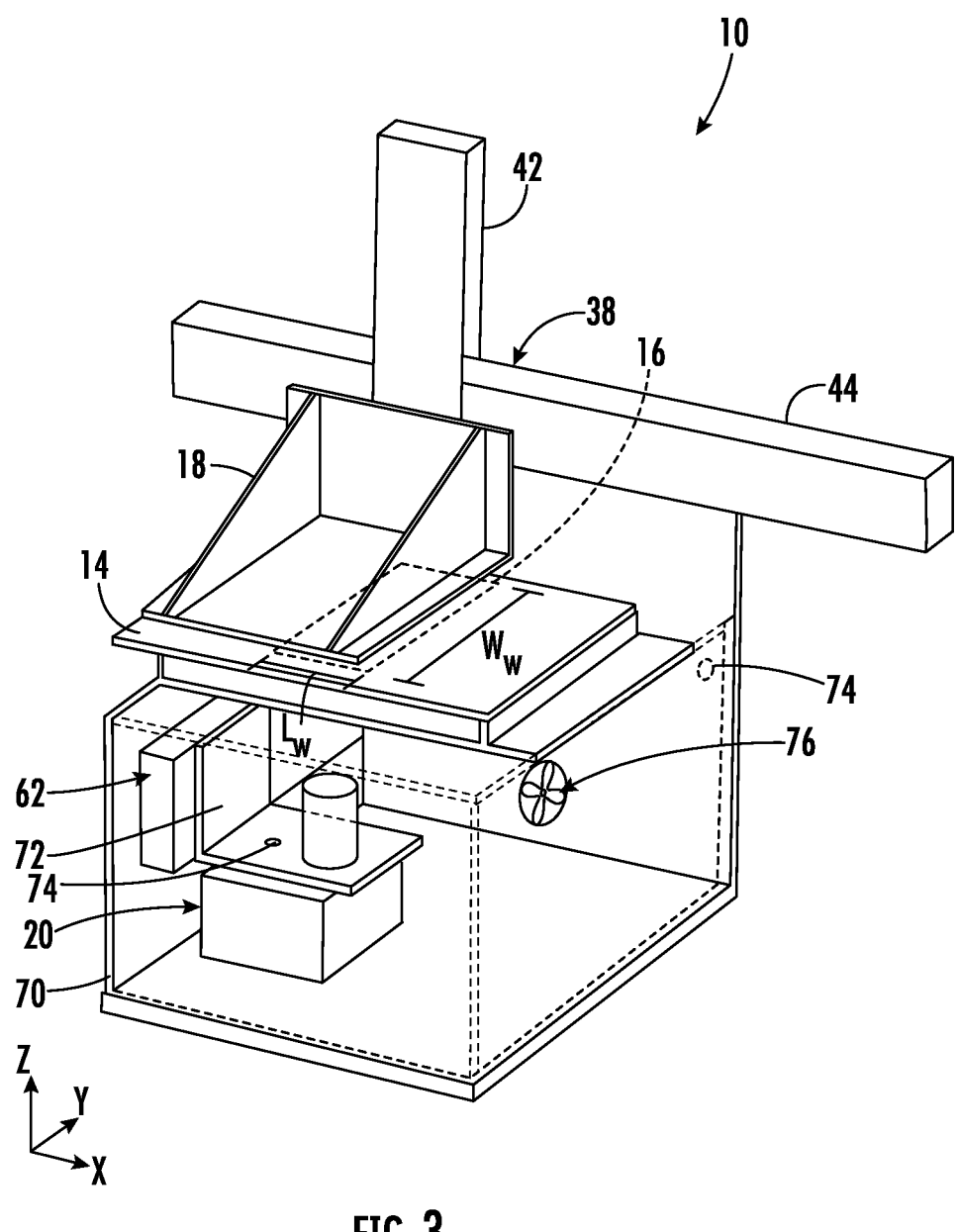
FIG. 3 is a front perspective view of the additive manufacturing apparatus in accordance with various aspects of the present disclosure.
Figure 4:
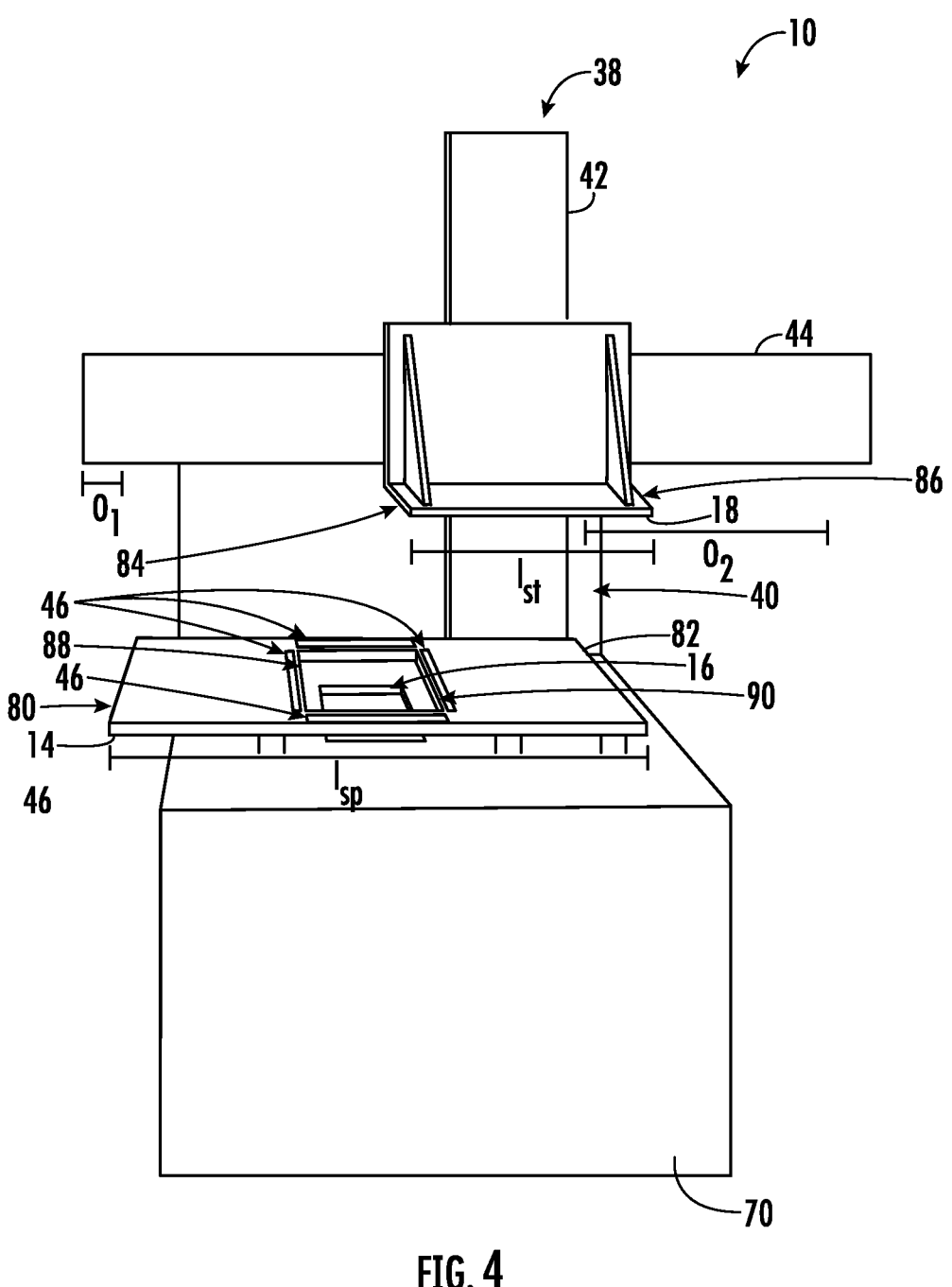
FIG. 4 is a front perspective view of the additive manufacturing apparatus in accordance with various aspects of the present disclosure.

Referring to FIGS. 3 and 4, front perspective views are provided of the additive manufacturing apparatus 10 including an actuator assembly 38 in accordance with exemplary embodiments of the present disclosure. It will be understood that, as a precursor to producing a component 12 and using the apparatus 10, the component 12 is software modeled as a stack of planar layers arrayed along the Z-axis. Depending on the type of curing method used, each layer may be divided into a grid of pixels.

The exemplary apparatus 10 may include a base structure 70 and a static support 40 extending from the base structure 70. A radiant energy device 20 may be positioned within the base structure 70. In the illustrated embodiments, the radiant energy device 20 may include a radiant energy source 50 operable to generate a patterned image 56 to be projected onto the surface of the resin R through the window 16. As an option, the radiant energy device 20 may be coupled with an image movement device 62 through a bracket 72. The movement device 62 may include actuators, mirrors, etc. that are configured to selectively move the radiant energy device 20, or another part of the radiant energy device 20, with the effect of rastering or shifting the location of a patterned image 56 relative to the window 16. Stated another way, the patterned image 56 may be moved away from a nominal or starting location. This permits a single radiant energy device 20 to cover a larger build area, for example. This type of image projection may be referred to herein as a "tiled image".

Additionally or alternatively, the apparatus 10 may include a plurality of radiant energy devices 20 that are operably coupled with the build zone 32. Each of the plurality of radiant energy devices 20 may or may not be configured to translate below the window 16 and/or the support plate 14. Moreover, each of the plurality of radiant energy devices 20 may generate an image 56 that at least partially overlaps with an image 56 of an additional radiant energy device to form a stitched image on the resin R. In various embodiments, the images 56 from each of the plurality of radiant energy devices 20 may have some degree of overlap where that overlap is a single pixel, less than one pixel (for example, half a pixel), or more than one pixel. Further, in some embodiments, optics 58 may be optically coupled with the one or more radiant energy devices 20. In such instances, at least one of the one or more radiant energy devices 20 and/or the optics 58 may translate along the Y-axis and/or otherwise move through the movement device 62 to produce patterned images 56 on various portions of the resin support 26.

The radiant energy device 20 cures various portions of the resin R to form a layer 68 of the component 12 by emitting one or more discrete patterned images 56 with movement of the radiant energy device 20 between each patterned image 56 that can be stitched to create the predefined layer geometry. As provided above, in various embodiments, the images 56 from the radiant energy device 20 may have some degree of overlap where that overlap is a single pixel, less than one pixel (for example, half a pixel), or more than one pixel. Additionally or alternatively, the radiant energy device 20 may be capable of performing a scanning process in which the consecutive patterned images 56 are emitted from the radiant energy device 20 as the radiant energy device 20 is translated along the movement device 62.

Further, in some embodiments, the apparatus 10 may include one or more sensors 74 that are configured to detect information related to a position of the stage 18, the resin support 26, or the radiant energy device 20. For example, the one or more sensors 74 may verify the position of the stage 18 and/or the resin support 26 each time the stage 18 and/or the resin support 26 are moved by the actuator assembly 38. Likewise, the one or more sensors 74 may verify the location of the radiant energy device 20 each time the radiant energy device 20 is translated by the movement device 62. In various embodiments, the one or more sensors 74 may be any combination of devices that is configured to provide information indicative of a position of the stage 18 and/or the resin support 26 or a location of the radiant energy device 20. For example, the one or more sensors 74 may include a gyroscope, an accelerometer, a proximity sensor, an image sensor, and/or any other practicable sensor.

In operation, the radiant energy device 20 and/or the movement assembly may produce heat. Accordingly, one or more vents and/or fans 76 may be positioned within the base structure 70 to remove heat from the base structure 70. The one or more fans 76 may be configured as any fluid movement device 62 that is capable of drawing the heated air from the base structure 70 to an area proximate the base structure 70.

As provided herein, the radiant energy device 20 may be operably coupled with a movement device 62, such as an actuator, that allows for the radiant energy device 20 to translate in a Y-axis direction. As the radiant energy device 20 may be moved relative to the window 16 along the Y-axis direction, the window 16 may have a width w of a first distance and a length $l_w$ of a second distance. The first distance may be generally equal to a movement distance of the radiant energy device 20 plus a width of the projected image generated by the radiant energy device 20. The second distance may be generally equal to a length of the projected image generated by the radiant energy device 20. Accordingly, in some instances, the first distance may be greater than the second length. However, it will be appreciated that the radiant energy device 20 may be capable of moving in any practicable direction and/or multiple directions.

With further reference to FIGS. 3 and 4, the actuator assembly 38 is operably coupled with the static support 40 and is configured to change a position of the stage 18. However, it will be appreciated that the actuator assembly 38 may be operably coupled with any other component without departing from the scope of the present disclosure.

As illustrated, the actuator assembly 38 includes a lateral actuator 44 operably coupled with the static support 40. Moreover, the vertical actuator 42 may be operably coupled with and moveable along the lateral actuator 44. The stage 18 may be operably coupled with the vertical actuator 42. As such, when the stage 18 is moved along the X-axis direction, the vertical actuator 42 and the stage 18 may move in conjunction with one another. When the stage 18 is moved in the Z-axis direction, the stage 18 moves along the vertical actuator 42. However, in other embodiments, the stage 18 and the lateral actuator 44 may move along the vertical actuator 42 in the Z-axis direction and the stage 18 may move along the lateral actuator 44 when the stage 18 is to be moved along the X-axis direction.

In the illustrated embodiment, the lateral actuator 44 may extend beyond the support plate 14 by a first offset distance $O_1$ in an X-axis direction on a first side portion 80 of the support plate 14. Likewise, the lateral actuator 44 may extend beyond the support plate 14 by a second offset distance $O_2$ in an X-axis direction on a second side portion 82 of the support plate 14. In some embodiments, the second offset distance $O_2$ may be greater than the first offset distance $O_1$. In other embodiments, the second offset distance $O_2$ may be less than and/or generally equal to the first offset distance $O_1$. For example, in one non-limiting example, the first offset distance $O_1$ may be between about 0 and 6 inches (in), 0.25 in and 4 in, and/or any other practicable distance. Conversely, the second offset distance $O_2$ may be between 0 in and 24 in, 1 in and 18 in, and/or any other practicable distance.

Moreover, as illustrated in FIGS. 3 and 4, in some embodiments, a length $l_{sp}$ of the support plate 14 may be defined between the first and second side portions 80, 82 of the support plate 14 in the X-axis direction. A length $l_{st}$ of the stage 18 may be defined between a first edge portion 84 and a second edge portion 86 of the stage 18 in the X-axis direction. Further, a length $l_w$ of the window 16 may be defined between a first edge portion 88 and a second edge portion 90 of the window 16 in the X-axis direction. In some instances, the length $l_{sp}$ of the support plate 14 may be greater than the length $l_{st}$ of the stage 18. In several embodiments, when the second edge portion 86 of the stage 18 is generally proximate with the second edge portion 90 of the window 16, the first side portion 80 of the support plate 14 may be proximate with the first edge portion 84 of the stage 18 in the Z-axis direction and/or the first side portion 80 of the support plate 14 extends outwardly of the first end portion of the stage 18. Moreover, when the first edge portion 84 of the stage 18 is proximate with the first edge portion 88 of the window 16, the second side portion 82 of the support plate 14 may be proximate with the second edge portion 86 of the stage 18 in the Z-axis direction and/or the second side portion 82 of the support plate 14 extends outwardly of the first edge portion 84 of the stage 18.

Now that the construction and configuration of the additive manufacturing apparatus 10 having the actuator assembly 38 have been described according to various examples of the present subject matter, a method 200 for operating an additive manufacturing apparatus 10 is provided in conjunction with illustrations of the various steps. The method 200 can be used to operate the additive manufacturing apparatus 10 or any other suitable additive manufacturing apparatus 10. It should be appreciated that the example method 200 is discussed herein only to describe example aspects of the present subject matter and is not intended to be limiting. Further, it will be appreciated the method has been broken into FIGS. 5A and 5B for clarity purposes. Any of the steps within FIGS. 5A and 5B may be omitted without departing from the scope of the present disclosure. Further, various steps of the method 200 are generally illustrated in FIGS. 6-11, as will be discussed in greater detail below. It will be appreciated that, while FIGS. 6-11 utilize a foil as the resin support, any other type of resin support may be used without departing from the scope of the present disclosure.

Figure 5A:
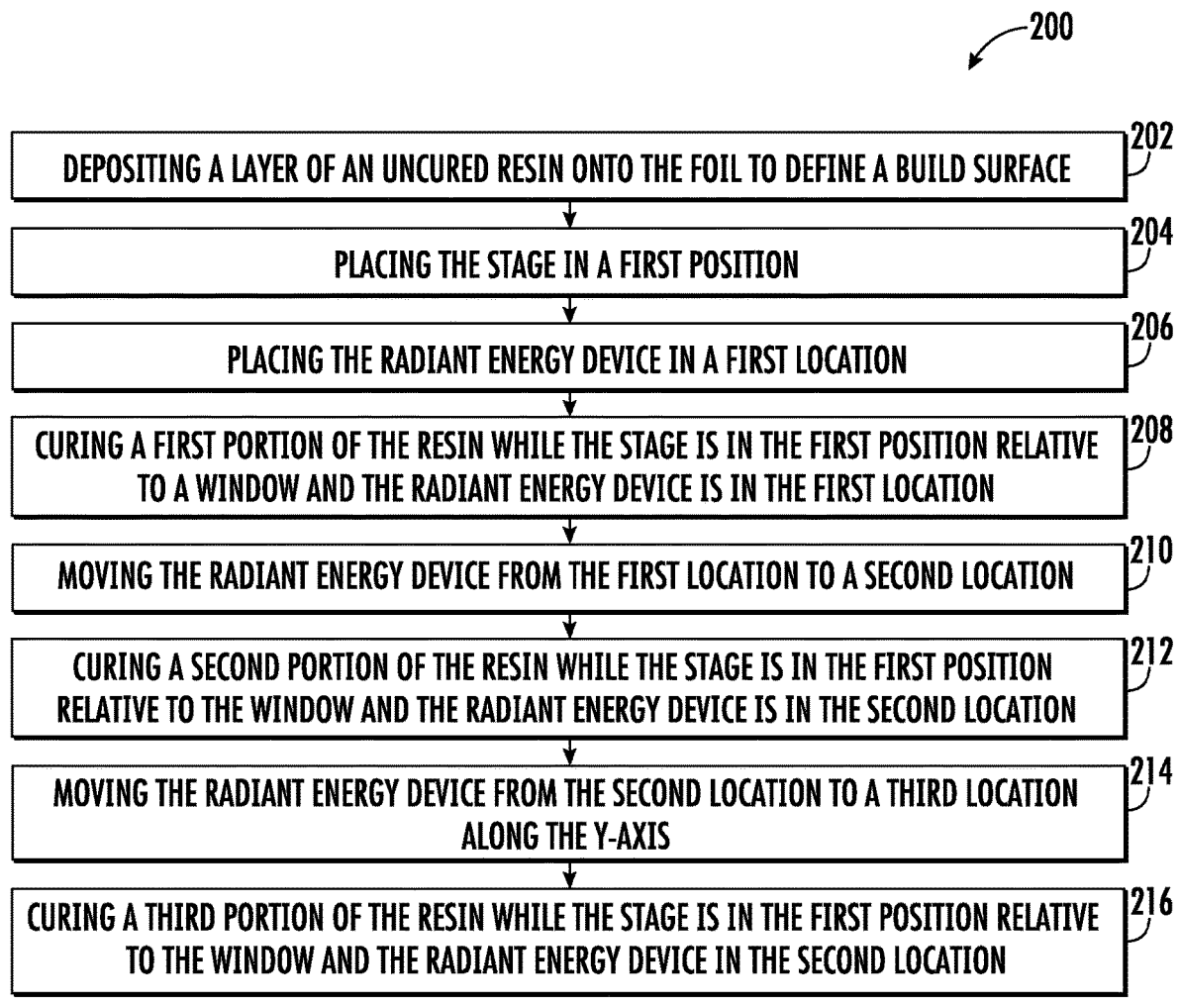
FIG. 5A is a first portion of a method of operating the manufacturing apparatus in accordance with various aspects of the present disclosure.
Figure 6:
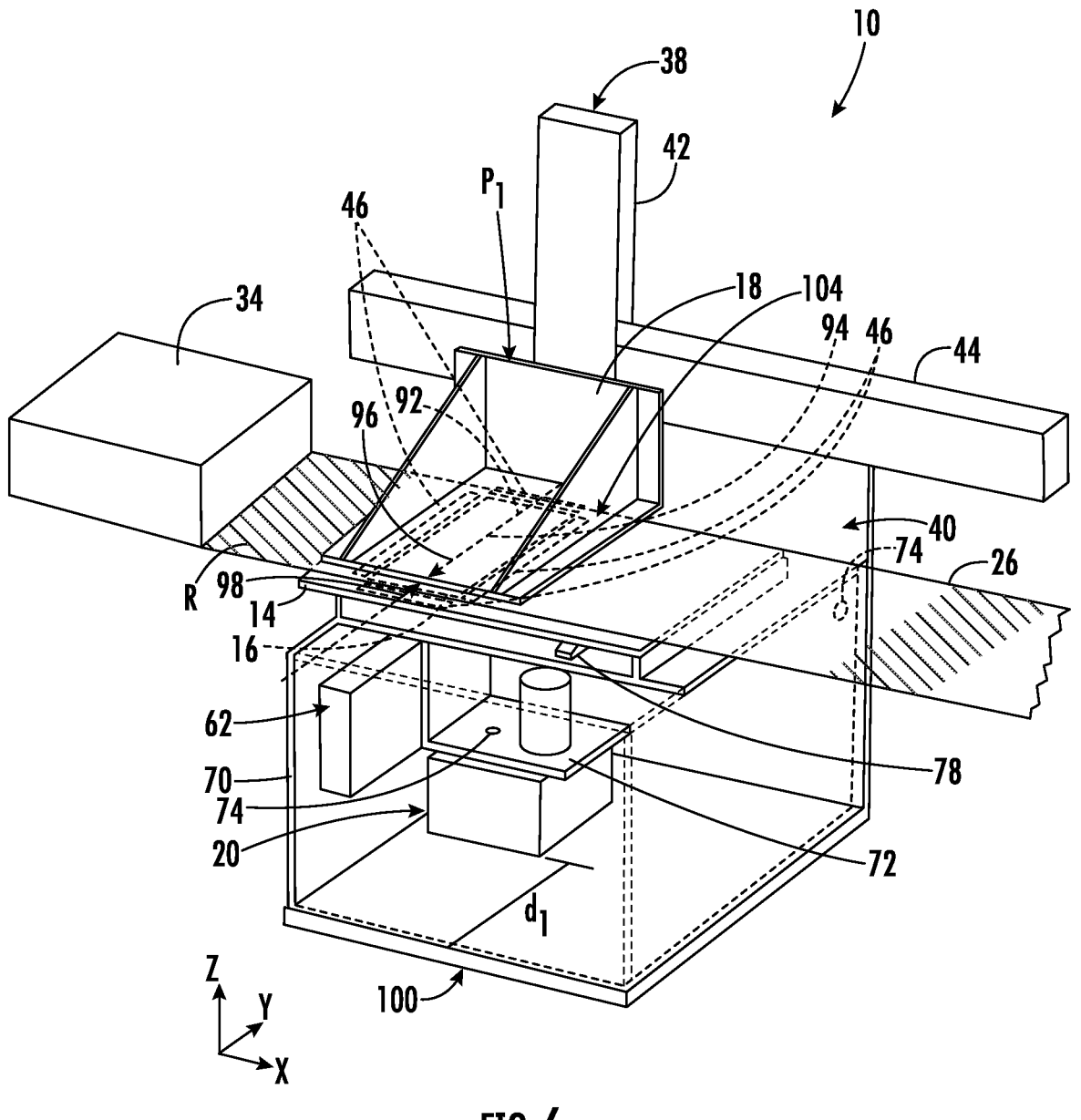
FIG. 6 is a front perspective view of the additive manufacturing apparatus with a stage in a first position and a radiant energy device in a first location in accordance with various aspects of the present disclosure.

Referring now to FIGS. 5A and 6, the method can include, at step 202, depositing a layer of an uncured resin onto the resin support 26 to define a build surface 30. During deposition of the resin R onto the resin support 26, the material retention assembly 46 that may be deactivated and the viscosity modification assembly 78 may be activated to apply a shearing stress to the resin R to alter a viscosity of the resin R.

As shown in FIGS. 5A and 6, at step 204, the method can include placing the stage 18 in a first position $P_1$ by moving the stage 18 in the Z-axis direction and/or an X-axis direction such that a working surface of the stage 18 and/or the component 12 retained by the stage 18 contacts the resin R. Movement of the stage 18 to the first position $P_1$ may be accomplished through an actuator assembly 38 that is positioned between the stage 18 and a static support 40.

With the stage 18 in the first position $P_1$, the stage 18 may be proximate and/or offset from the window 16 in the X-axis direction. For example, as generally illustrated in FIG. 6, the stage 18 may define a center portion 92 in the Y-axis direction and the window 16 may define a center segment 94. In some instances, the center portion 92 may be offset from the window 16 in the X-axis direction and/or the center segment 94 of the window 16 in the X-axis direction. However, it will be appreciated that the center portion 92 of the stage 18 and the center segment 94 of the window 16 may be generally proximate when the stage is in the first position $P_1$.

As the stage 18 is moved in the Z-axis direction and/or an X-axis direction such that a working surface of the stage 18 and/or the component 12 retained by the stage 18 contacts the resin R, the material retention assembly 46 may be activated to retain the resin support 26 in a generally stationary position. Further, the viscosity modification assembly 78 may also be activated to apply a shearing stress to the resin R to alter a viscosity of the resin R.

Moreover, when the stage 18 is placed in the first position $P_1$, the resin support 26 and the stage 18 may be retained in a fixed position relative to one another while a layer 68 of the component is formed. For clarity purposes, arrow 96 on the stage 18 generally illustrates a consistent location on the stage 18. Likewise, arrow 98 on the resin support 26 represents a consistent location on the resin support 26.

Next at step 206, the method can include placing the radiant energy device 20 in a first location in which the radiant energy device 20 is located a first distance $d_1$ from a forward portion 100 of the base structure 70. As provided herein, the radiant energy device 20 may be coupled with a movement assembly that is further coupled to the base structure 70.

At step 208, the method can include curing a first portion of the resin R while the stage 18 is in the first position $P_1$ relative to a window 16 and the radiant energy device 20 in a first location on an opposing side of the resin support 26 from the stage 18 by applying radiant energy from a radiant energy device 20 through the window 16 and the resin support 26. As provided herein, the radiant energy may be in the form of a first patterned image 56 that is transmitted through at least a first segment of the window 16. For example, in the non-limiting exemplary embodiment of FIG. 6, the first patterned image 56 is transmitted through a rear segment 104 of the window 16 that is proximate to the actuator assembly 38.

As the first portion of the resin R is cured while the stage 18 is in the first position $P_1$ relative to a window 16, the material retention assembly 46 may continue to be activated to retain the resin support 26 in a generally stationary position. Further, the viscosity modification assembly 78 may be deactivated.

Figure 7:
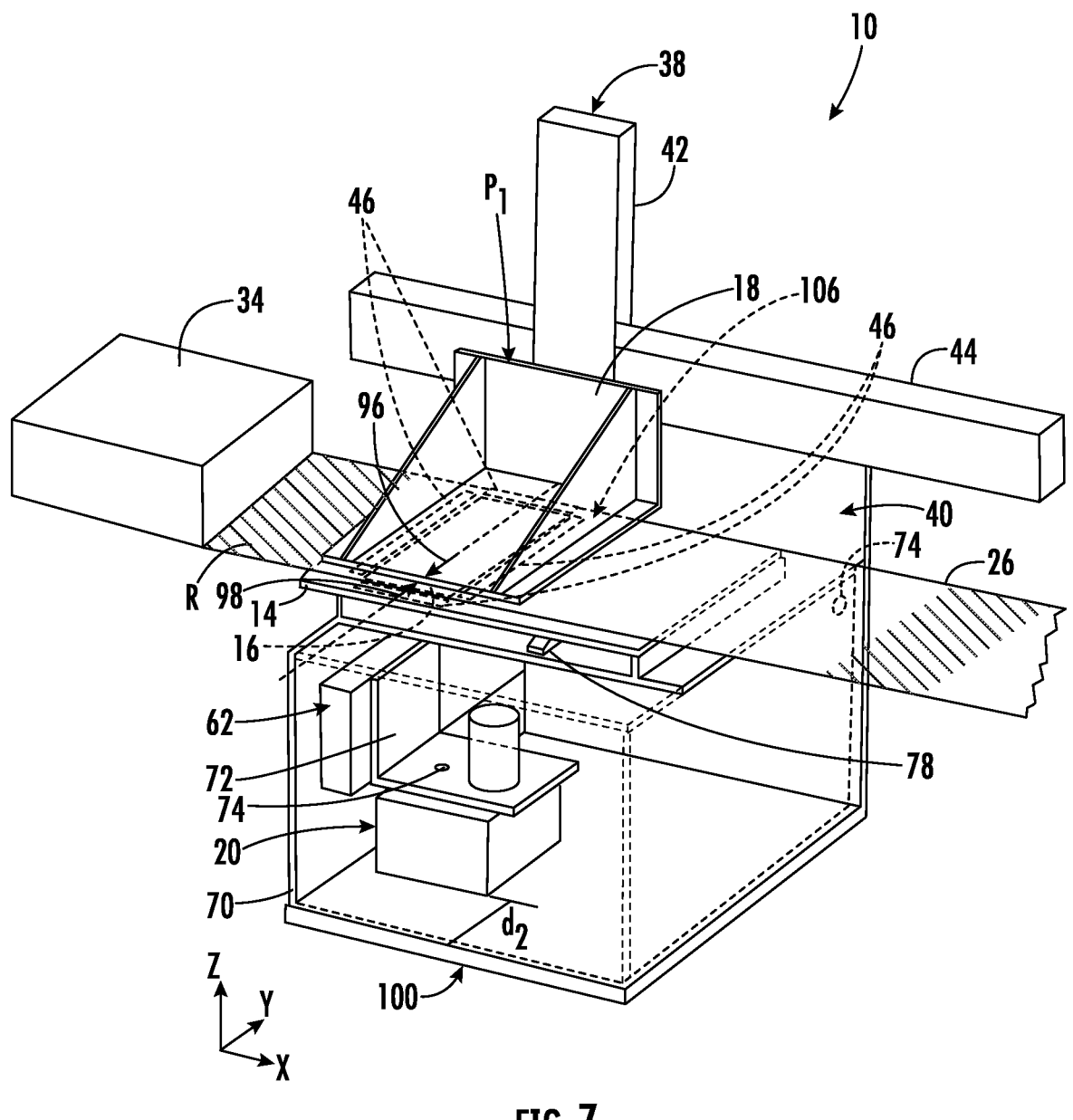
FIG. 7 is a front perspective view of the additive manufacturing apparatus while the stage is in the first position and the radiant energy device in a second location in accordance with various aspects of the present disclosure.

As illustrated in FIGS. 5A and 7, at step 210, the method can include moving the radiant energy device 20 from the first location to a second location along the Y-axis in which the radiant energy device 20 is located a second distance $d_2$ from the forward portion 100 of the base structure 70. At step 212, the method can include curing a second portion of the resin while the stage 18 is in the first position $P_1$ relative to the window 16 and the radiant energy device 20 in the second location on an opposing side of the resin support 26 from the stage 18 by applying radiant energy from a radiant energy device 20 through the window 16 and the resin support 26. As provided herein, the radiant energy may be in the form of a second patterned image 56 that is transmitted through at least a segment of the window 16, which may be offset from the first segment of the window 16. For example, in the non-limiting exemplary embodiment of FIG. 7, the second patterned image 56 is transmitted through an intermediate segment 106 of the window 16. It will be appreciated that the second patterned image 56 may be different and/or generally similar to that of the first patterned image 56.

As the radiant energy device 20 is moved from the first location to the second location along the Y-axis and the second portion is cured, the material retention assembly 46 may continue to be activated to retain the resin support 26 in a generally stationary position. Further, the viscosity modification assembly 78 may continue to be deactivated.

Figure 8:
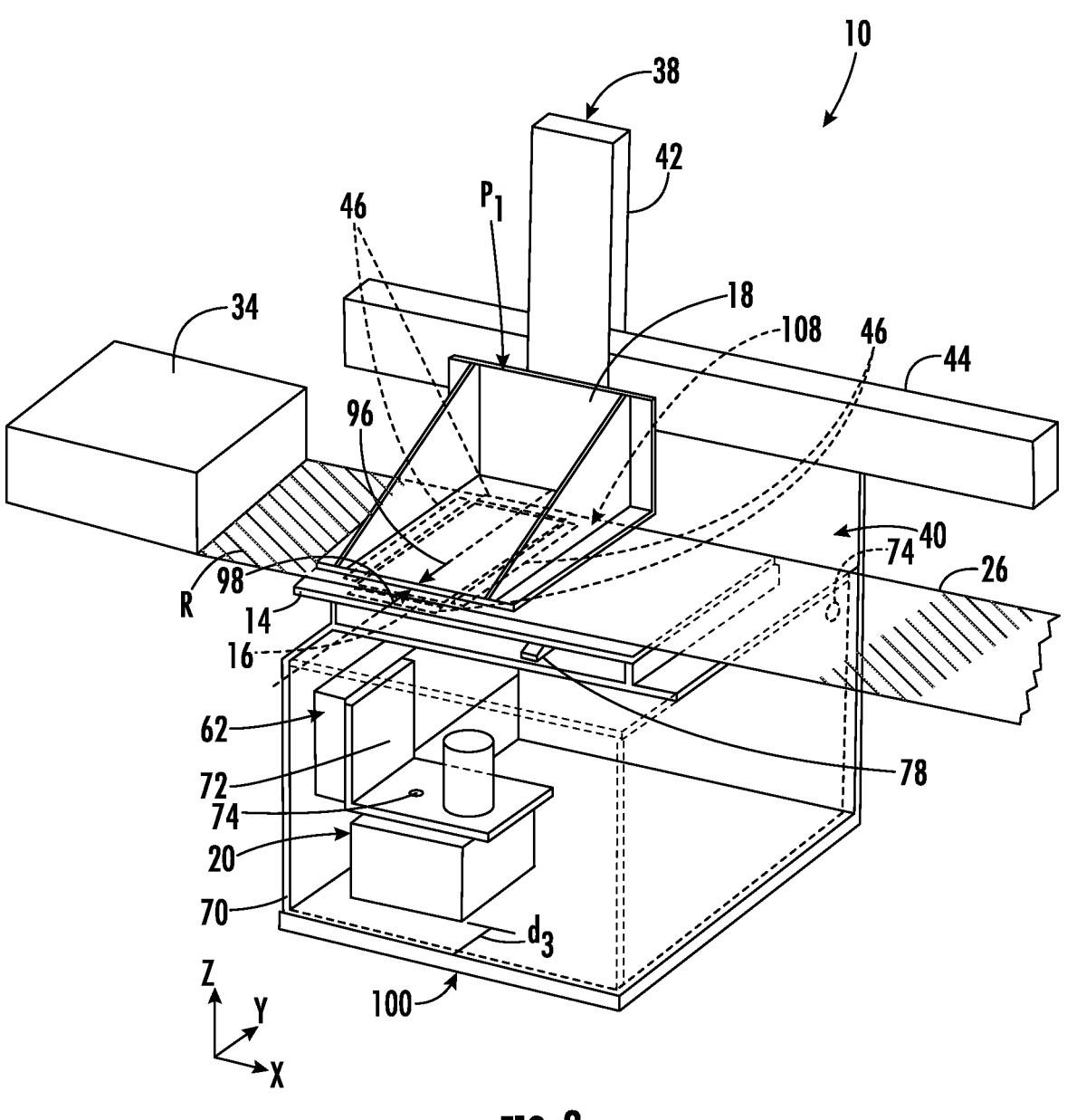
FIG. 8 is a front perspective view of the additive manufacturing apparatus while the stage is in the first position and the radiant energy device in a third location in accordance with various aspects of the present disclosure.

As illustrated in FIGS. 5A and 8, at step 214, the method can include moving the radiant energy device 20 from the second location to a third location along the Y-axis in which the radiant energy device 20 is located a third distance d₃ from the forward portion 100 of the base structure 70. At step 216, the method can include curing a third portion of the resin while the stage 18 and the resin support 26 are in the first position P₁ relative to the window 16 and the radiant energy device 20 in the third location on an opposing side of the resin support 26 from the stage 18 by applying radiant energy from the radiant energy device 20 through the window 16 and the resin support 26. As provided herein, the radiant energy may be in the form of a third patterned image 56 that is transmitted through at least a segment of the window 16. For example, in the non-limiting exemplary embodiment of FIG. 8, the third patterned image 56 is transmitted through the forward segment 108 of the window 16. It will be appreciated that the third patterned image 56 may be different and/or generally similar to that of the first patterned image 56 and/or the second patterned image 56.

As the radiant energy device 20 is moved from the second location to the third location along the Y-axis and the third portion is cured, the material retention assembly 46 may continue to be activated to retain the resin support 26 in a generally stationary position. Further, the viscosity modification assembly 78 may continue to be deactivated.

Figure 5B:
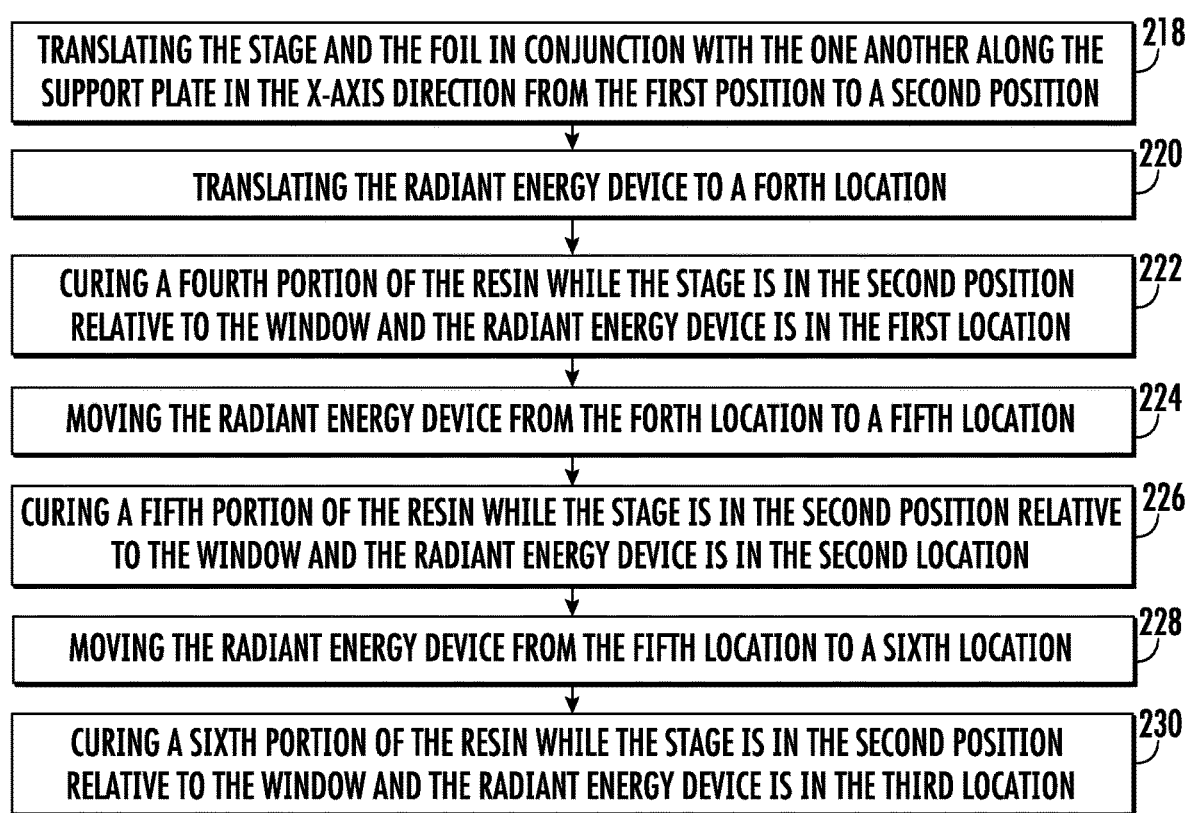
FIG. 5B is a first portion of a method of operating the manufacturing apparatus in accordance with various aspects of the present disclosure.
Figure 9:
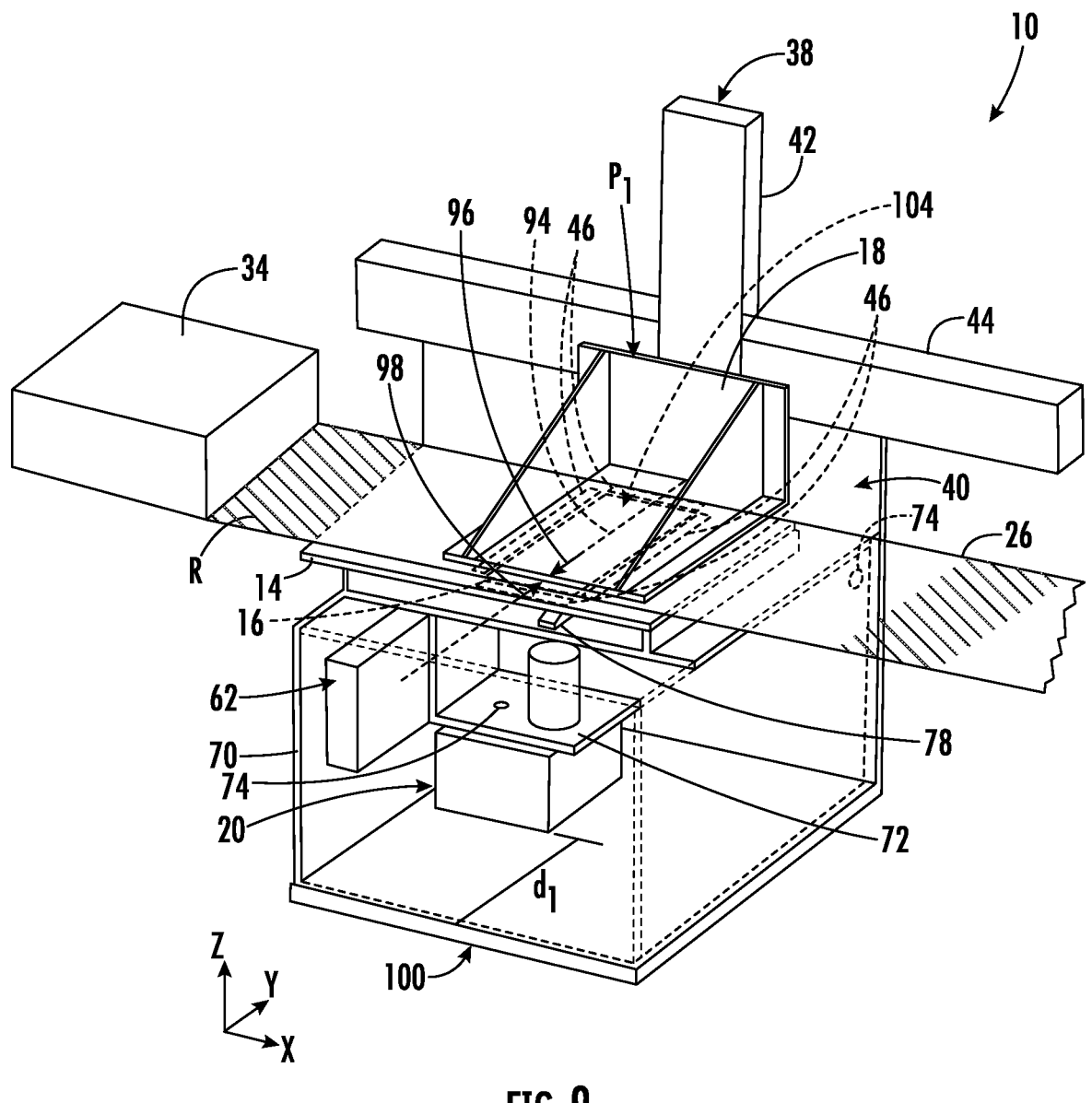
FIG. 9 is a front perspective view of the additive manufacturing apparatus while the stage is in a second position and the radiant energy device in the first location in accordance with various aspects of the present disclosure.

Referring now to FIGS. 5B and 9, at step 218, the method can include translating the stage 18 and the resin support 26 in conjunction with one another along the support plate 14 in the X-axis direction from the first position P₁ to a second position P₂. In some embodiments, the first and second positions P₁, P₂ may be offset from one another and the stage 18 may at least partially overlap the window 16 in both of the first and second positions P₁, P₂.

As generally illustrated by arrows 96 and 98, the resin support 26 and the stage 18 maintain a locus relative to one another as they are translated along the support plate 14 simultaneously. As such, the speed, acceleration, distance, etc. that each of the resin support 26 and the stage 18 are moved is generally common. Moreover, as the stage 18 and the resin support 26 are translated along the support plate 14 in conjunction with one another, the height of the stage 18 relative to the support plate 14 can be maintained to retain a similar layer increment to that of the resin during steps 202-216.

As the stage 18 and the resin support 26 are translated in conjunction (e.g., simultaneously moved) with one another along the support plate 14 in the X-axis direction from the first position P₁ to the second position P₂, the material retention assembly 46 may be deactivated to release the resin support 26 and allow translation along the support plate 14. In addition, the viscosity modification assembly 78 may continue to be deactivated.

In order to translate the resin support 26 and the stage 18 in conjunction with one another, the drive system 28 (FIG. 12) of the resin support 26 may control the resin support movement while the actuator assembly 38 controls the movement of the stage 18. As such, the computing system 60 may be operably coupled with both of the drive system 28 and the actuator assembly 38 for controlling movement of each component. Various sensors 74 may be provided for detecting data related to movement of the stage 18 and/or the resin support 26. The data may be provided to the computing system 60, which, in turn, can alter a movement characteristic of the stage 18 and/or the resin support 26 in order to maintain the locus of the components relative to one another as the stage and the resin support 26 are moved, possibly simultaneously.

Next at step 220, the method can include translating the radiant energy device 20 to the first location in which the radiant energy device 20 is located a fourth distance d₄ from the forward portion 100 of the base structure 70. In some instances, the first location may be generally similar to the first location. Conversely, in some examples, the first location may be generally similar to the third location, which may allow for the radiant energy device 20 to cure in two opposing directions thereby potentially allowing for reduced build times when compared to the radiant energy device 20 curing in a single direction.

With further reference to FIGS. 5B and 9, at step 222, the method can include curing a fourth portion of the resin while the stage 18 is in the second position P₂ relative to the window 16 and the radiant energy device 20 in the first location on an opposing side of the resin support 26 from the stage 18 by applying radiant energy from a radiant energy device 20 through the window 16 and the resin support 26. As provided herein, the radiant energy may be in the form of a fourth patterned image 56 that is transmitted through at least a segment of the window 16. For example, in the non-limiting exemplary embodiment of FIG. 9, the fourth patterned image 56 is transmitted through the rear segment 104 of the window 16.

As the radiant energy device 20 is moved to the first location and the fourth portion is cured, the material retention assembly 46 may be activated to retain the resin support 26 in a generally stationary position. Further, the viscosity modification assembly 78 may continue to be deactivated.

Figure 10:
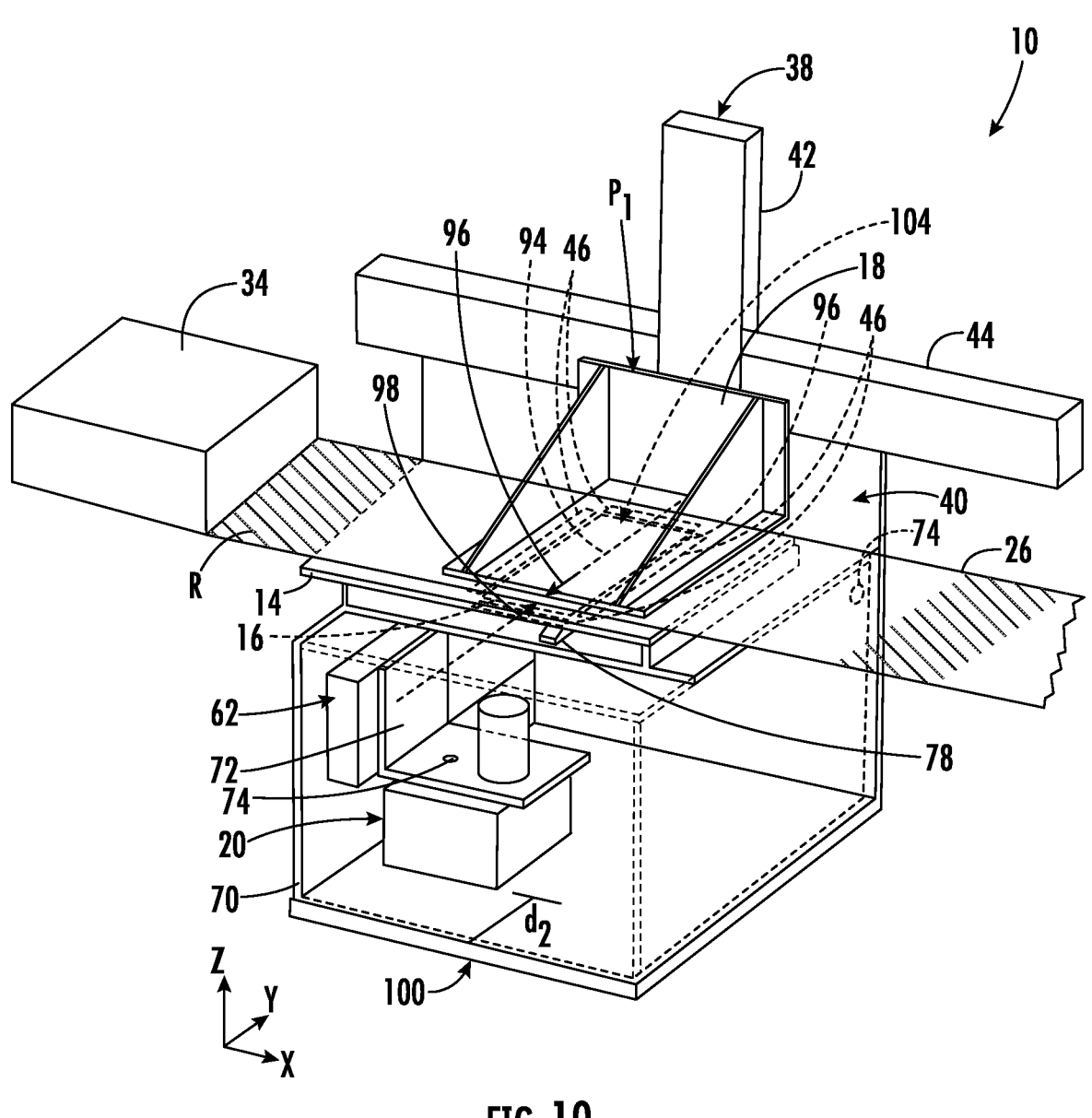
FIG. 10 is a front perspective view of the additive manufacturing apparatus while the stage is in the second position and the radiant energy device in the second location in accordance with various aspects of the present disclosure.

As illustrated in FIGS. 5B and 10, at step 224, the method can include moving the radiant energy device 20 from the first location to the second location along the Y-axis in which the radiant energy device 20 is located a fifth distance d₅ from the forward portion 100 of the base structure 70. At step 226, the method can include curing a fifth portion of the resin while the stage 18 is in the second position P₂ relative to the window 16 and the radiant energy device 20 in the second location on an opposing side of the resin support 26 from the stage 18 by applying radiant energy from the radiant energy device 20 through the window 16 and the resin support 26. As provided herein, the radiant energy may be in the form of a fifth patterned image 56 that is transmitted through at least a segment of the window 16. For example, in the non-limiting exemplary embodiment of FIG. 10, the fifth patterned image 56 is transmitted through an intermediate segment 106 of the window 16. It will be appreciated that the fifth patterned image 56 may be different or generally similar to that of the first patterned image 56, the second patterned image 56, the third patterned image 56, and/or the fourth patterned image 56.

As the radiant energy device 20 is moved from the first location to the second location and the fifth portion is cured, the material retention assembly 46 may continue to be activated to retain the resin support 26 in a generally stationary position. Further, the viscosity modification assembly 78 may continue to be deactivated.

Figure 11:
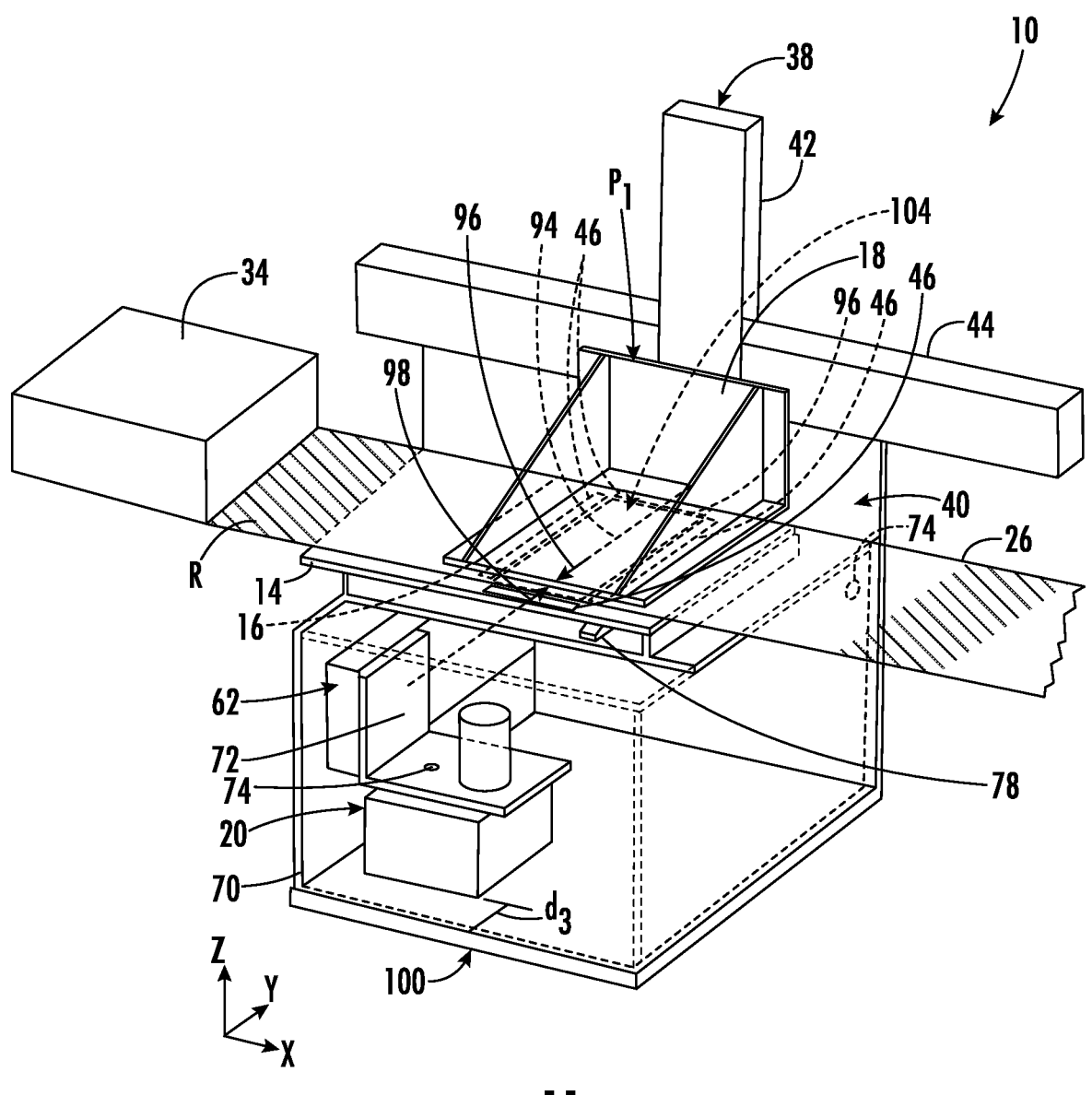
FIG. 11 is a front perspective view of the additive manufacturing apparatus while the stage is in the second position and the radiant energy device in the third location in accordance with various aspects of the present disclosure.

As illustrated in FIGS. 5B and 11, at step 228, the method can include moving the radiant energy device 20 from the second location to the third location along the Y-axis in which the radiant energy device 20 is located a sixth distance $d_6$ from the forward portion 100 of the base structure 70. At step 230, the method can include curing a sixth portion of the resin while the stage 18 and the resin support 26 are in the second position $P_2$ relative to the window 16 and the radiant energy device 20 in the third location on an opposing side of the resin support 26 from the stage 18 by applying radiant energy from the radiant energy device 20 through the window 16 and the resin support 26. As provided herein, the radiant energy may be in the form of a sixth patterned image 56 that is transmitted through at least a segment of the window 16. For example, in the non-limiting exemplary embodiment of FIG. 11, the sixth patterned image 56 is transmitted through a forward segment 108 of the window 16. It will be appreciated that the sixth patterned image 56 may be different or generally similar to that of the first patterned image 56, the second patterned image 56, the third patterned image 56, the fourth patterned image 56, and/or the fifth patterned image 56. It will be appreciated that any of the distances provided herein may be measured from any reference point based on the movement of the various components of the additive manufacturing apparatus 10.

As the radiant energy device 20 is moved from the second location to the third location and the sixth portion is cured, the material retention assembly 46 may continue to be activated to retain the resin support 26 in a generally stationary position. Further, the viscosity modification assembly 78 may continue to be deactivated.

As provided herein, the radiant energy source may emit discrete patterned images 56 with movement of the radiant energy device 20 and/or the stage 18 and the resin support 26 between each patterned image 56 that may be stitched to create the predefined layer geometry. Additionally or alternatively, the radiant energy device 20 may be capable of performing a scanning process in which the consecutive patterned images 56 are emitted from the radiant energy device 20 as the radiant energy device 20 is translated along the movement device 62. In such examples, the radiant energy device 20 may emit an image while in the first location, during movement from the first location to the second location (e.g., scanning by simultaneously moving the radiant energy device 20 along the X-axis direction and emitting one or more images while moving the radiant energy device 20), while in the second location, during movement from the second location to the third location, and/or while in the third location. Likewise, the radiant energy device 20 may emit a scan during movement from the third location to the first location, while in the first location, during movement from the first location to the second location, while in the firth location, during movement from the second location to the third location, and/or while in the third location.

After the sixth portion of the resin is cured, the layer of the component 12 may be completed. Each layer of the component 12 may have a different geometry such that the number of positions the stage 18 may be positioned in and/or the number of locations that the radiant energy device 20 is placed in may differ from layer to layer.

Once each layer of the component 12 is completed, the stage 18 may be moved past the window 16 in the X-axis direction (e.g., downstream of a radiant energy exposure field generated by the radiant energy source 50 and transmitted through the window 16) and/or vertically away from the window 16 in the Z-axis direction. Either direction may cause the newly formed layer to separate from the resin support 26. In various embodiments, a peeling device may be positioned within the apparatus 10 and configured to assist in separation of the resin support 26 from the component 12. Once the stage 18 and the resin support 26 are separated, a new portion of resin is translated along the support plate 14 and the stage 18 is moved to a new first position $P_1$, which may be the same or a different first position from the previous layer 68, for the next layer of the component 12. In some instances, when the stage 18 is moved to a subsequent first position $P_1$, the stage 18 may move along the X-axis in a direction that is opposite to the movement of the resin support 26 along the X-axis. The method provided herein may then repeated for each additional layer until the component 12 is complete.

As the component 12 and the resin support are separated from one another, the material retention assembly 46 may continue to be activated to retain the resin support 26 in a generally stationary position if the stage is moved in the Z-axis direction. Additionally or alternatively, the material retention assembly 46 may be deactivated to release the resin support 26 so that the resin support 26 and/or the stage 18 can be moved in the Z-axis direction and/or the X-axis direction. Further, the viscosity modification assembly 78 may be activated to assist in separating the component 12 from the resin support 26.

It will be appreciated that the stage 18 and the resin support 26 may move to any number (one or more) positions to form each layer 68 of the component 12 based on the component design. For example, the method in some instances, may include curing a first portion of the resin while the stage 18 and the resin support are in a first position $P_1$ relative to the window 16 by applying radiant energy from a radiant energy device 20 through the window 16. The method may also include translating the stage 18 and the resin support simultaneously along the window 16 in an X-axis direction. Lastly, the method may include curing a second portion of the resin while the stage 18 and the resin support are in a second position $P_2$ relative to the window 16 by applying radiant energy from a radiant energy device 20 through the window 16.

Likewise, the radiant energy device 20 may be translated to any number of locations (one or more) and generate any number of patterned images 56 while positioned in any of the one or more locations. For instance, various methods can include projecting a first patterned image 56 through a first segment of the window 16 defined by a support plate 14, translating the radiant energy device 20 along a Y-axis direction, and projecting a second patterned image 56 through a second segment of the window 16. The stage 18 and the resin support 26 can be positioned in the first position $P_1$ while the first patterned image 56 and the second patterned image 56 are projected.

Figure 12:
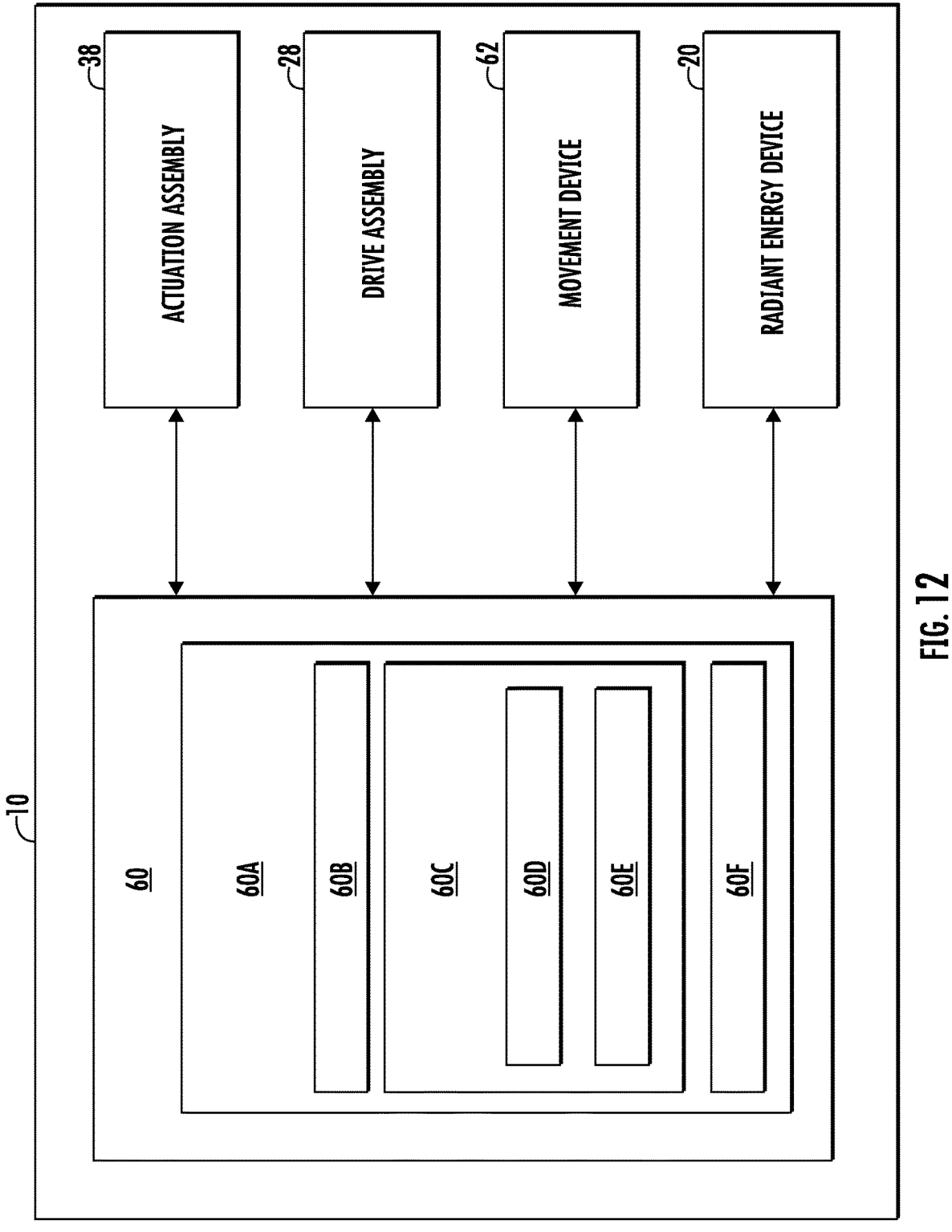
FIG. 12 depicts an exemplary computing system for an additive manufacturing apparatus in accordance with various aspects of the present disclosure.

FIG. 12 depicts certain components of computing system 60 according to example embodiments of the present disclosure. The computing system 60 can include one or more computing device(s) 60A which may be used to implement the method 200 such as described herein. The computing device(s) 60A can include one or more processor(s) 60B and one or more memory device(s) 60C. The one or more processor(s) 60B can include any suitable processing device, such as a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs) (e.g., dedicated to efficiently rendering images), processing units performing other specialized calculations, etc. The memory device(s) 60C can include one or more non-transitory computer-readable storage medium(s), such as RAM, ROM, EEPROM, EPROM, flash memory devices, magnetic disks, etc., and/or combinations thereof.

The memory device(s) 60C can include one or more computer-readable media and can store information accessible by the one or more processor(s) 60B, including instructions 60D that can be executed by the one or more processor(s) 60B. The instructions 60D may include one or more steps of the method 200 described above, such as to execute operations of the actuator assembly 38, the drive system 28, the movement device 62, and/or the radiant energy device 20 of the additive manufacturing apparatus 10 described above. For instance, the memory device(s) 60C can store instructions 60D for running one or more software applications, displaying a user interface, receiving user input, processing user input, etc. In some implementations, the instructions 60D can be executed by the one or more processor(s) 60B to cause the one or more processor(s) 60B to perform operations, e.g., such as one or more portions of methods described herein. The instructions 60D can be software written in any suitable programming language or can be implemented in hardware. Additionally, and/or alternatively, the instructions 60D can be executed in logically and/or virtually separate threads on processor(s) 60B.

The one or more memory device(s) 60C can also store data 60E that can be retrieved, manipulated, created, or stored by the one or more processor(s) 60B. The data 60E can include, for instance, data to facilitate performance of the method 200 described herein. The data 60E can be stored in one or more database(s). The one or more database(s) can be connected to computing system 60 by a high bandwidth LAN or WAN, or can also be connected to the computing system 60 through network(s) (not shown). The one or more database(s) can be split up so that they are located in multiple locales. In some implementations, the data 60E can be received from another device.

The computing device(s) 58A can also include a communication module or interface 60F used to communicate with one or more other component(s) of computing system 60 or the additive manufacturing apparatus 10 over the network(s). The communication interface 60F can include any suitable components for interfacing with one or more network(s), including for example, transmitters, receivers, ports, controllers, antennas, or other suitable components.

As provided herein, the computing system 60 may be operably coupled with one or more of the actuator assembly 38, the drive system 28, the movement device 62, and/or the radiant energy device 20. The drive system 28 may control the foil movement while the actuator assembly 38 controls the movement of the stage 18. As such, the computing system 60 may be configured to control actuation of each of the drive assembly and the actuator assembly 38. Likewise, the computing system 60 may be operably coupled with the movement device 62 to place the radiant energy device 20 in one or more positions. Various sensors 74 may be provided for detecting information related to movement of the stage 18, the resin support 26 and/or the radiant energy device 20. The information may be provided to the computing system 60, which, in turn, can alter a movement characteristic of the stage 18, the resin support 26 and/or the radiant energy device 20 in order to maintain the locus of the components relative to one another.

It should be appreciated that the additive manufacturing apparatus is described herein only for the purpose of explaining aspects of the present subject matter. In other example embodiments, the additive manufacturing apparatus may have any other suitable configuration and may use any other suitable additive manufacturing technology. Further, the additive manufacturing apparatus and processes or methods described herein may be used for forming components using any suitable material. For example, the material may be plastic, metal, concrete, ceramic, polymer, epoxy, photopolymer resin, or any other suitable material that may be embodied in a layer of slurry, resin, or any other suitable form of sheet material having any suitable consistency, viscosity, or material properties. For example, according to various embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt based superalloys (e.g., those available under the name Inconel® available from Special Metals Corporation). These materials are examples of materials suitable for use in the additive manufacturing processes described herein and may be generally referred to as "additive materials."

Aspects of the invention(s) are provided by the subject matter of the following clauses, which are intended to cover all suitable combinations unless dictated otherwise based on logic or the context of the clauses and/or associated figures and description:

An additive manufacturing apparatus comprising a support plate defining a window; a resin support configured to support an uncured layer of resin; a stage configured to hold one or more cured layers of the resin to form a component positioned opposite the support plate; and a radiant energy device positioned on an opposite side of the resin support from the stage and operable to generate and project radiant energy in a patterned image through the window, wherein the stage is configured to move simultaneously with the resin support from a first position to a second position in an X-axis direction.

The additive manufacturing apparatus of one or more of these clauses, further comprising an actuator assembly operably coupled with the stage and a static support, the actuator assembly configured to alter the stage along the window in an X-axis direction and away from the window in a Z-axis direction.

The additive manufacturing apparatus of one or more of these clauses, further comprising a material retention assembly configured to retain the resin support in a predefined position along the support plate.

The additive manufacturing apparatus of one or more of these clauses, wherein the stage is offset from the window in a Y-axis direction in at least one of the first and second positions.

The additive manufacturing apparatus of one or more of these clauses, wherein a first portion of the resin is cured by the radiant energy device when the stage and the resin support are in the first position and a second portion of the resin is cured by the radiant energy device when the stage and the resin support are in the second position.

The additive manufacturing apparatus of one or more of these clauses, further comprising a movement device positioned between the radiant energy device and a base structure, wherein the movement device is configured to move the radiant energy device between a first location and a second location.

The additive manufacturing apparatus of one or more of these clauses, wherein the radiant energy device is configured to project a first patterned image through a first segment of the window when in the first location and a second patterned image through a second segment of the window when in the second location, wherein the first segment of the window is offset from the second segment of the window.

The additive manufacturing apparatus of one or more of these clauses, wherein the actuator assembly is configured to translate the stage downstream of a radiant energy exposure field.

The additive manufacturing apparatus of one or more of these clauses, wherein the radiant energy device is translated between a first location and a second location while the stage and the resin support are in the first position and the first location and the second location while the stage and the resin support are in the second position.

The additive manufacturing apparatus of one or more of these clauses, wherein the stage is maintained at a generally consistent height from the support plate as the stage and the resin support are simultaneously moved from the first position to the second position.

The additive manufacturing apparatus of one or more of these clauses, further comprising a sensor configured to detect information related to a position of the stage, the resin support, or the radiant energy device.

A method of operating an additive manufacturing apparatus, the method comprising depositing a layer of a resin onto a resin support; moving a stage in a Z-axis direction such that a working surface contacts the layer of the resin; curing a first portion of the resin while the stage and the resin support are in a first position relative to a window by applying radiant energy from a radiant energy device through the window; translating the stage and the resin support simultaneously along the window in an X-axis direction; and curing a second portion of the resin while the stage and the resin support are in a second position relative to the window by applying radiant energy from the radiant energy device through the window.

The method of one or more of these clauses, wherein a center axis of the stage in a Y-axis direction is offset in an X-direction from the window in at least one of the first position and the second position.

The method of one or more of these clauses, further comprising projecting a first patterned image through a first segment of a window defined by a support plate with the radiant energy device in a first location; translating the radiant energy device along a Y-axis direction; and projecting a second patterned image through a second segment of the window with the radiant energy device in a second location, wherein the stage and the resin support are positioned in the first position while the first patterned image and the second patterned image are projected.

The method of one or more of these clauses, further comprising performing a scanning process by emitting consecutive patterned images from the radiant energy device as the radiant energy device is translated from the first location to the second location.

The method of one or more of these clauses, wherein translating the stage and the resin support simultaneously along the window in the X-axis direction further comprises maintaining a height between the stage and a support plate as the stage and the resin support are translated from the first position to the second position.

An additive manufacturing apparatus comprising: a drive assembly configured to translate a resin support along a support plate in an X-axis direction; a stage configured to hold a component; a radiant energy device positioned on an opposite side of the resin support from the stage and operable to generate and project radiant energy in a patterned image; an actuator assembly configured to move the stage in the X-axis direction; and a computing system configured to actuate the drive assembly and the actuator to translate the stage from a first position to a second position in the X-axis direction simultaneously with the resin support.

The additive manufacturing apparatus of one or more of these clauses, wherein the radiant energy device is operably coupled with a movement device, the movement device configured to translate the radiant energy device between a first and a second location in a Y-axis direction.

The additive manufacturing apparatus of one or more of these clauses, wherein the radiant energy device projects a first patterned image onto a first portion of the resin and a second patterned image onto a second portion of the resin.

The additive manufacturing apparatus of one or more of these clauses, further comprising a viscosity modification assembly configured to alter a first viscosity of the resin to a second viscosity.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An additive manufacturing apparatus comprising:
   a support plate defining a window;
   a resin support configured to support an uncured layer of resin;
   a stage configured to hold one or more cured layers of the resin to form a component positioned opposite the support plate, wherein the stage is configured to move simultaneously at a common speed with the resin support from a first position to a second position in an X-axis direction with the stage and the resin support separated from one another by a common distance while the stage and the resin support move from the first position to the second position;
   a radiant energy device positioned on an opposite side of the resin support from the stage and operable to generate and project radiant energy in a patterned image through the window; and
   a pneumatic material retention assembly configured to retain the resin support in a predefined position along the support plate in an activated state and allow translation of the resin support along the support plate in a deactivated state, the pneumatic material retention assembly in the activated state when the radiant energy device projects radiant energy through the window and deactivated when the stage and the resin support move simultaneously from the first position to the second position.

2. The additive manufacturing apparatus of claim 1, further comprising:

an actuator assembly operably coupled with the stage and a static support, the actuator assembly configured to alter the stage along the window in an X-axis direction and away from the window in a Z-axis direction.

3. The additive manufacturing apparatus of claim 1, wherein the stage is offset from the window in a Y-axis direction in at least one of the first and second positions.

4. The additive manufacturing apparatus of claim 1, wherein a first portion of the resin is cured by the radiant energy device when the stage and the resin support are in the first position and a second portion of the resin is cured by the radiant energy device when the stage and the resin support are in the second position.

5. The additive manufacturing apparatus of claim 1, further comprising:

a movement device positioned between the radiant energy device and a base structure, wherein the movement device is configured to move the radiant energy device between a first location and a second location.

6. The additive manufacturing apparatus of claim 5, wherein the radiant energy device is configured to project a first patterned image through a first segment of the window when in the first location and a second patterned image through a second segment of the window when in the second location, wherein the first segment of the window is offset from the second segment of the window.

7. The additive manufacturing apparatus of claim 2, wherein the actuator assembly is configured to translate the stage downstream of a radiant energy exposure field.

8. The additive manufacturing apparatus of claim 1, wherein the radiant energy device is translated between a first location and a second location while the stage and the resin support are in the first position and the first location and the second location while the stage and the resin support are in the second position.

9. The additive manufacturing apparatus of claim 1, wherein the stage is maintained at a generally consistent height from the support plate as the stage and the resin support are simultaneously moved from the first position to the second position.

10. The additive manufacturing apparatus of claim 1, further comprising:

a sensor configured to detect information related to a position of the stage, the resin support, or the radiant energy device.

11. An additive manufacturing apparatus comprising:

a drive assembly configured to translate a resin support along a support plate in an X-axis direction;

a stage configured to hold a component;

a radiant energy device positioned on an opposite side of the resin support from the stage and operable to generate and project radiant energy in a patterned image;

an actuator assembly configured to move the stage in the X-axis direction;

a computing system configured to actuate the drive assembly and the actuator to translate the stage from a first position to a second position in the X-axis direction simultaneously and at a common acceleration with the resin support while maintaining a constant height of the stage relative to the support plate; and a viscosity modification assembly operably coupled with the resin support and configured to apply a shearing stress to the resin to alter a first viscosity of the resin to a second viscosity.

12. The additive manufacturing apparatus of claim 11, wherein the radiant energy device is operably coupled with a movement device, the movement device configured to translate the radiant energy device between a first and a second location in a Y-axis direction.

13. The additive manufacturing apparatus of claim 11, wherein the radiant energy device projects a first patterned image onto a first portion of the resin and a second patterned image onto a second portion of the resin.

14. An additive manufacturing apparatus comprising:

a drive assembly configured to translate a resin support along a support plate in an X-axis direction;

a stage configured to hold a component;

a base structure energy device;

a radiant energy device positioned within the base structure and on an opposite side of the resin support from the stage and operable to generate and project radiant energy in a patterned image;

a movement device configured to translate the radiant energy device between a first and a second location in a Y-axis direction;

a computing system configured to actuate the drive assembly and the actuator to translate the stage from a first position to a second position in the X-axis direction simultaneously and at a common acceleration with the resin support while maintaining a constant height of the stage relative to the support plate, the computing system further configured to move the radiant energy device from the first location to the second location along the Y-axis relative to a forward portion of the base structure; and a viscosity modification assembly operably coupled with the resin support and configured to apply a shearing stress to the resin to alter a first viscosity of the resin to a second viscosity.

15. The additive manufacturing apparatus of claim 14, wherein the radiant energy device projects a first patterned image onto a first portion of the resin and a second patterned image onto a second portion of the resin.

* * * * *